Feb. 15, 1966 — L. SHAPIRO — 3,235,727

ELECTRON PROBE SYSTEM

Filed March 2, 1961 — 10 Sheets-Sheet 1

INVENTOR.
LOUIS SHAPIRO
BY
ATTORNEY

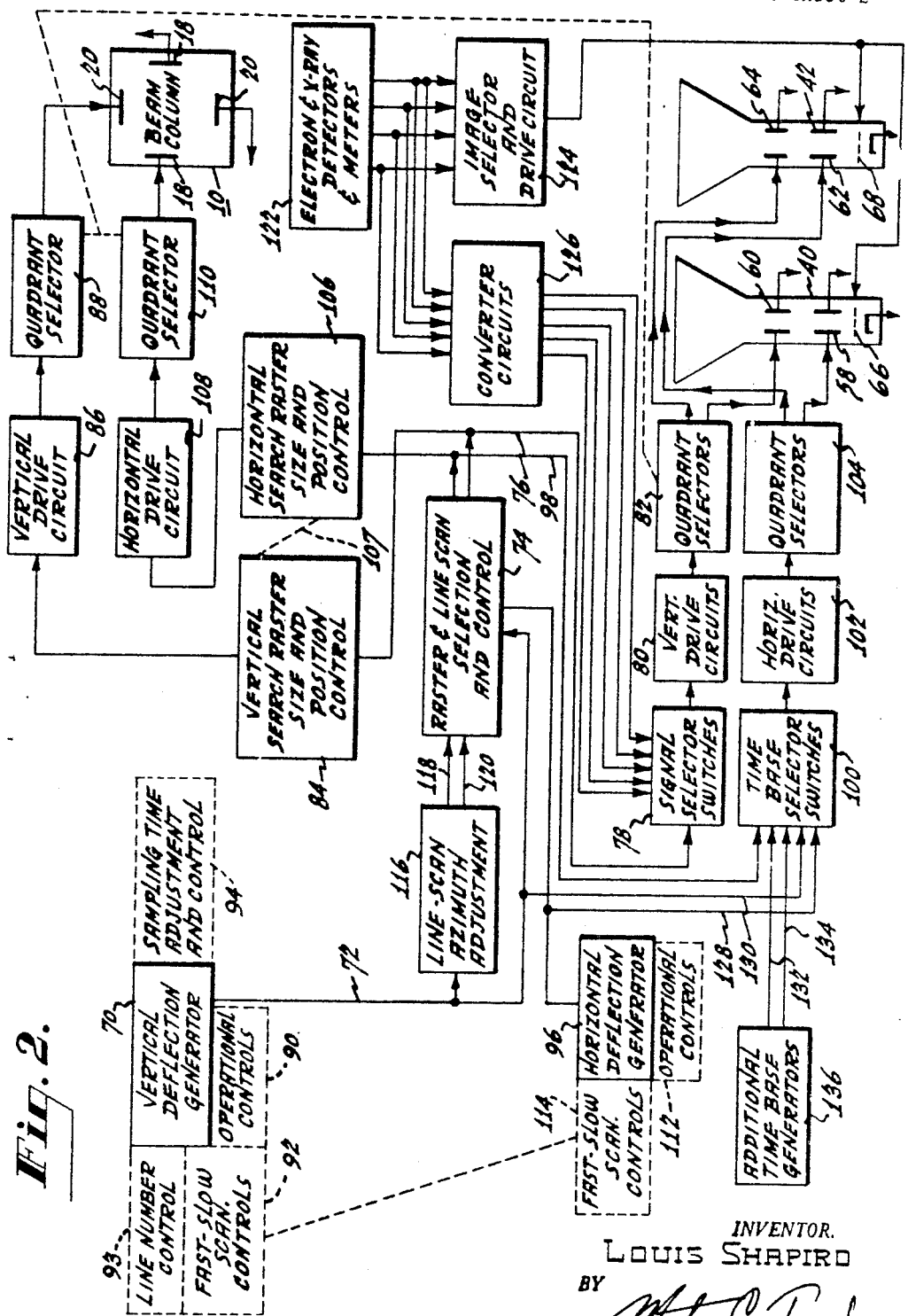

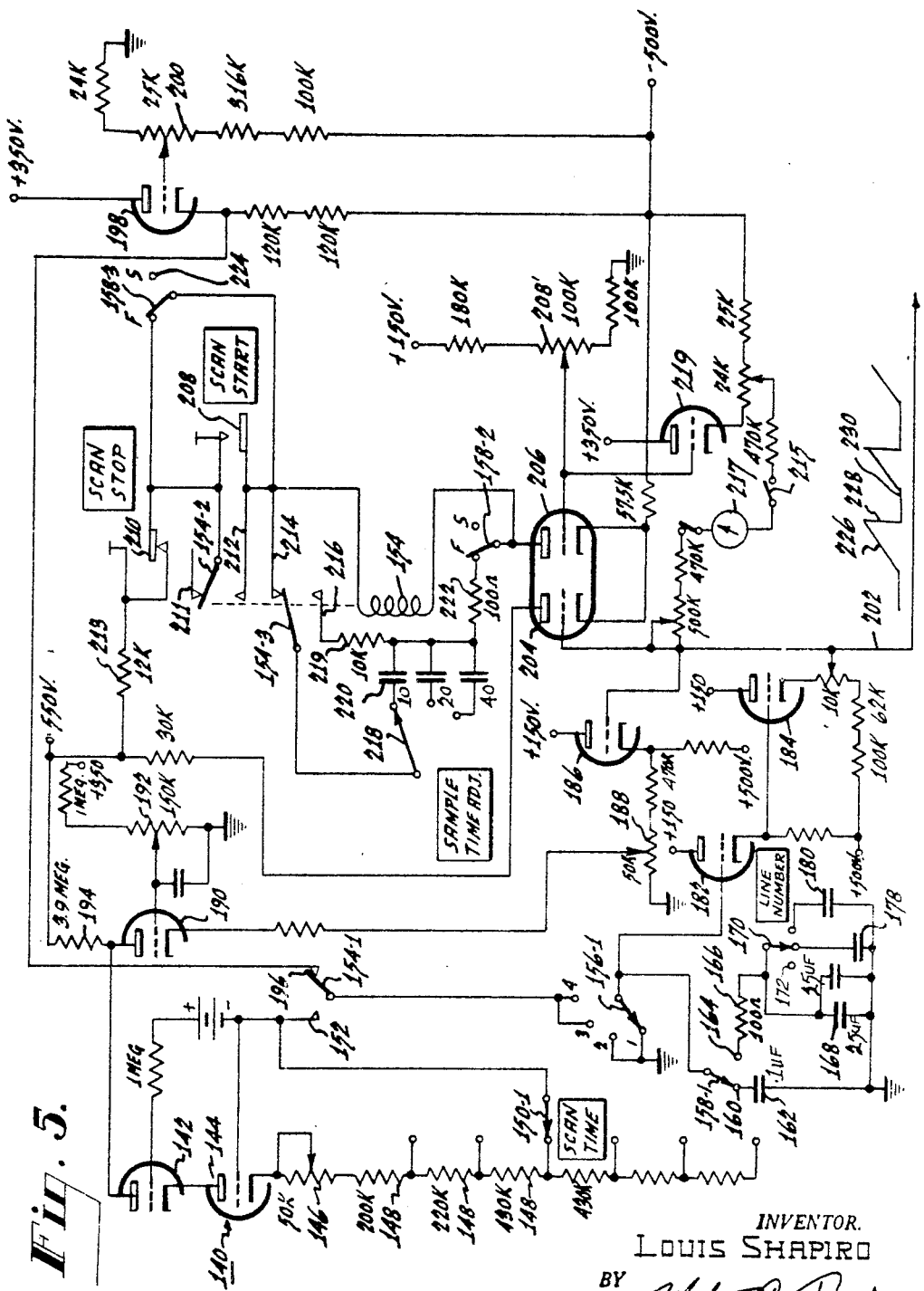

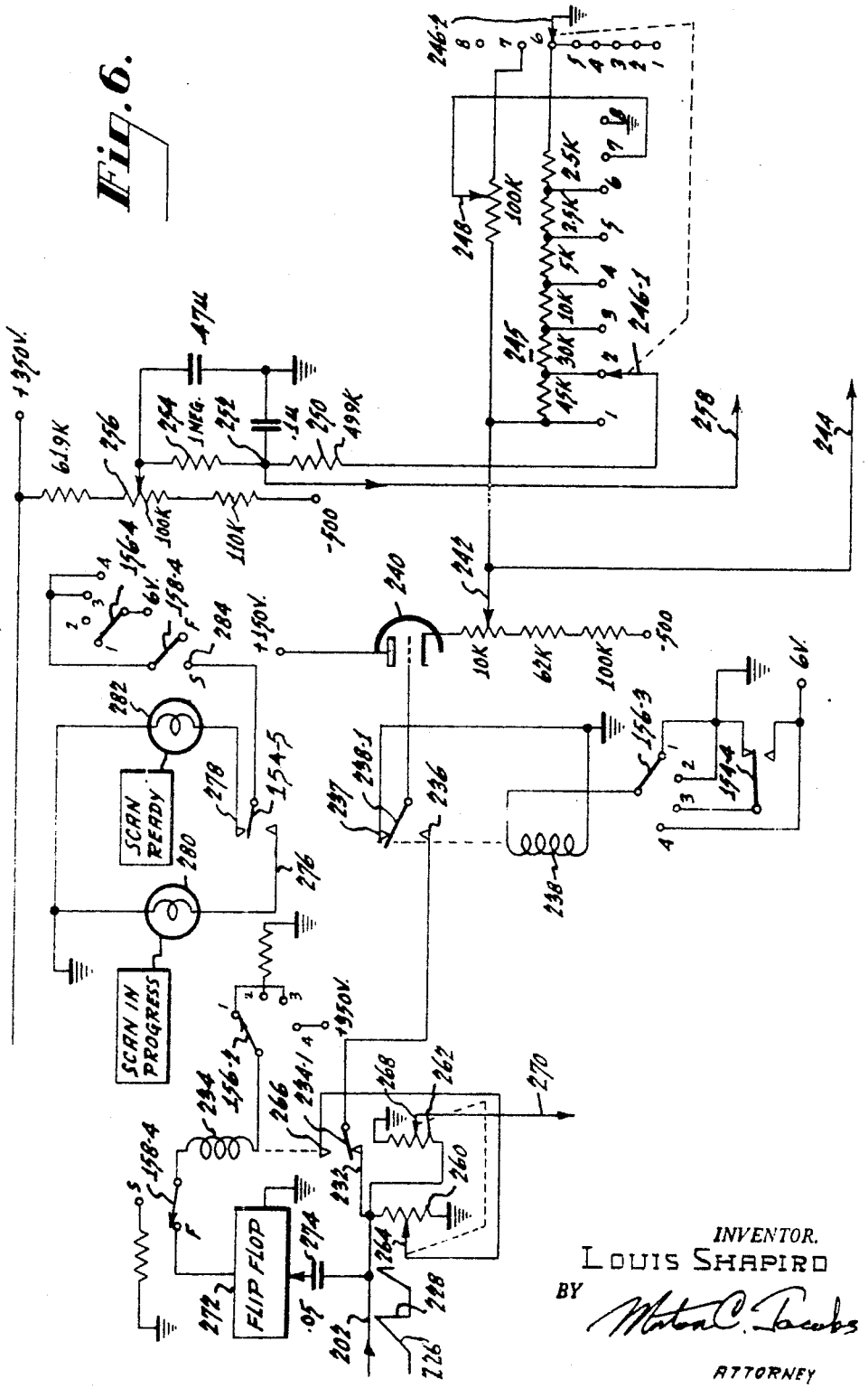

Feb. 15, 1966 L. SHAPIRO 3,235,727
ELECTRON PROBE SYSTEM
Filed March 2, 1961 10 Sheets-Sheet 5
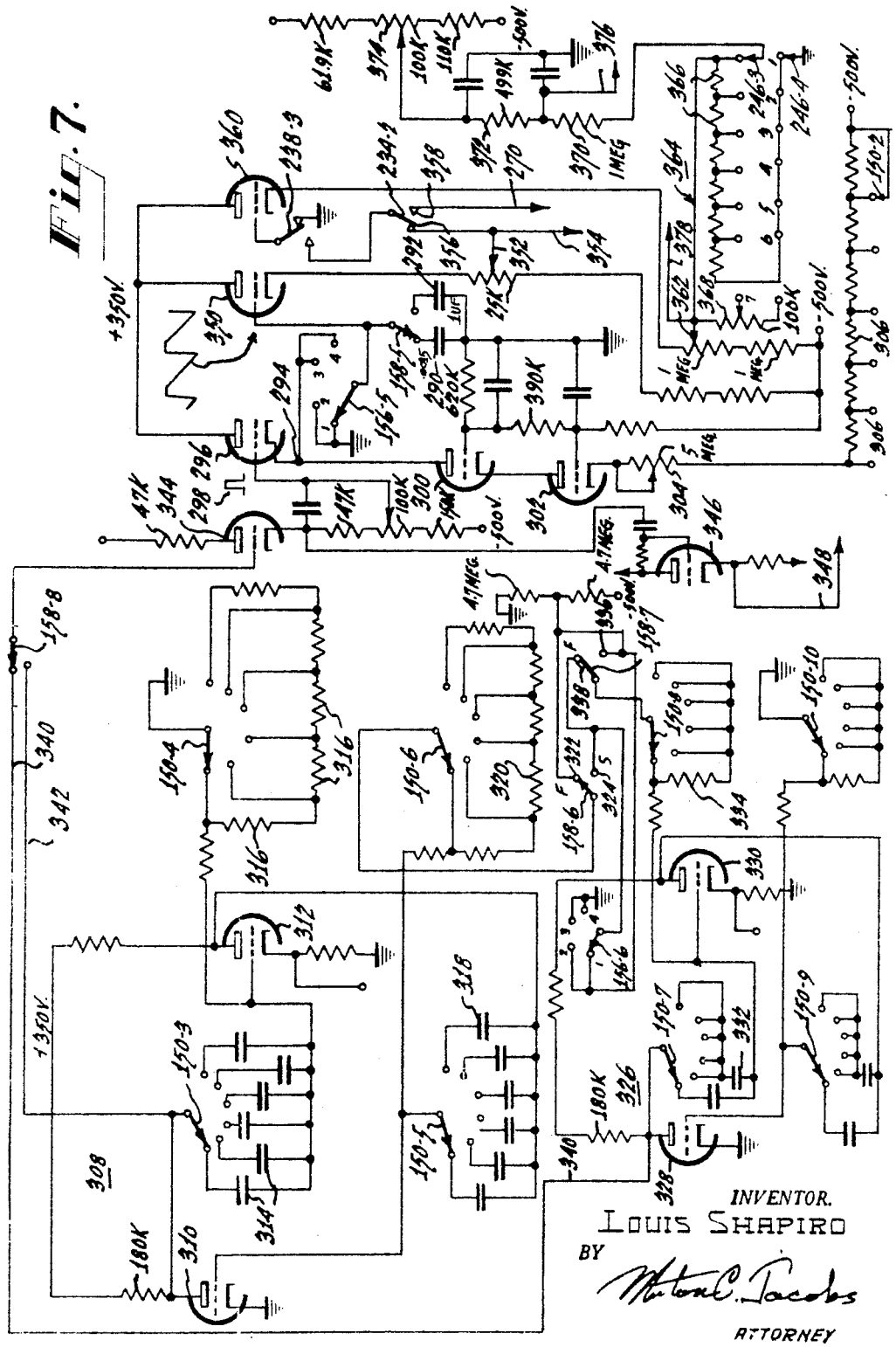
INVENTOR.
LOUIS SHAPIRO
BY
ATTORNEY Feb. 15, 1966 L. SHAPIRO 3,235,727
ELECTRON PROBE SYSTEM
Filed March 2, 1961 10 Sheets-Sheet 6
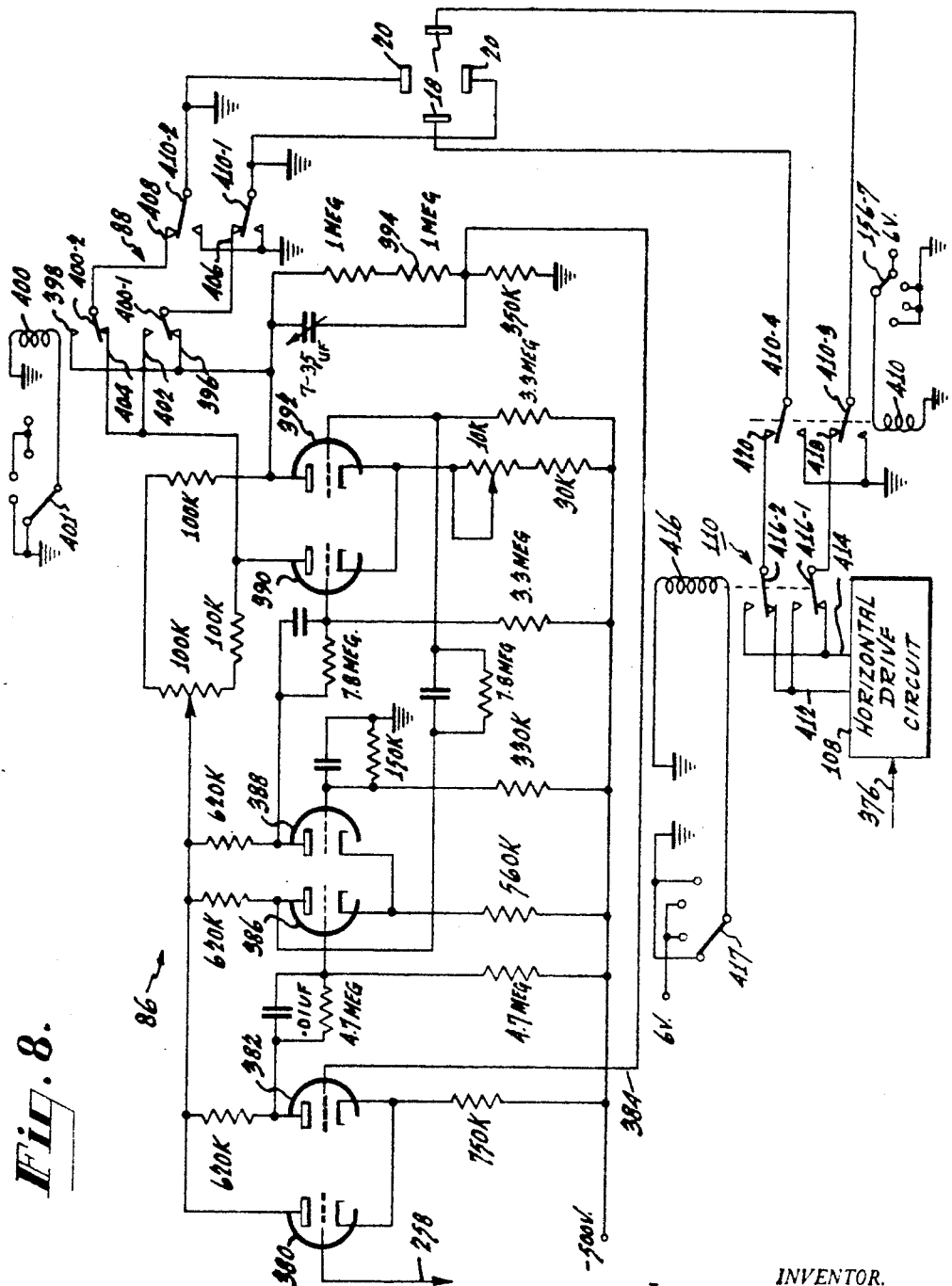
Fig. 8.
INVENTOR.
LOUIS SHAPIRO
BY
ATTORNEY

INVENTOR.
LOUIS SHAPIRO
BY
ATTORNEY

Feb. 15, 1966     L. SHAPIRO     3,235,727
ELECTRON PROBE SYSTEM
Filed March 2, 1961     10 Sheets-Sheet 10
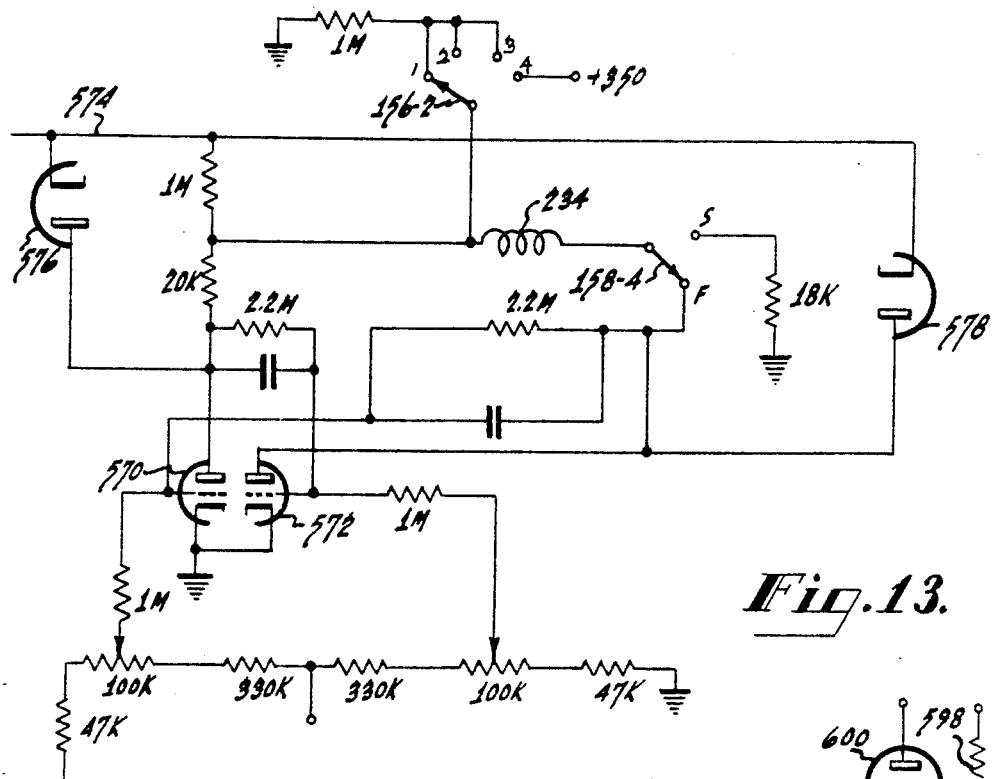
*Fig.13.*
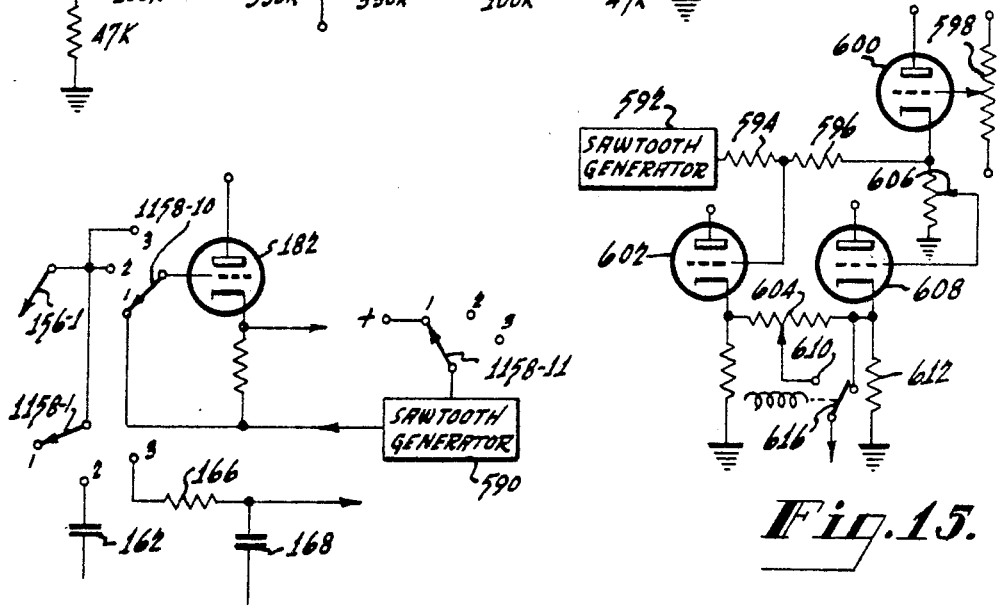
*Fig.14.*     *Fig.15.*
INVENTOR.
LOUIS SHAPIRO
BY *Maton C. Jacobs*
ATTORNEY United States Patent Office 3,235,727
Patented Feb. 15, 1966

3,235,727
ELECTRON PROBE SYSTEM
Louis Shapiro, Erlton, N.J., assignor, by mesne assignments, to The First Pennsylvania Banking and Trust Company
Filed Mar. 2, 1961, Ser. No. 92,889
40 Claims. (Cl. 250—49.5)

This invention relates to electron beam probe systems such as those of electron microscopy and X-ray microanalysis.

X-ray microanalysis has been developed as a powerful tool in metallurgical analysis. It involves the irradiation of a microscopic area of a specimen with a beam of electrons to stimulate the emission of X-rays. The characteristics of the emitted X-rays are analyzed by means of a spectrometer in order to determine the characteristics of the specimen from which they were emitted. With the techniques of electron optics the electron beam can be directed as a stationary probe to an area of one micron and less. This probe has been used to analyze minutely the variations in composition occurring from point to point in a specimen.

The microanalysis techniques have been combined with electronic deflection of the electron probe. The scanning techniques provide a display image of the X-ray emission over a substantial area of the specimen. In addition, these scanning techniques permit the development of an electron display image as in electron microscopy at the same time the X-ray image is being developed.

It is an object of this invention to provide a new and improved electron beam probe system.

Another object is to provide a new and improved system for X-ray microanalysis.

Another object is to provide a new and improved scanning and image display system.

Another object is to provide an X-ray microanalyzer having a new and improved scanning system.

Another object is to provide a new and improved microanalyzer having a scanning system for locating areas of a specimen to be analyzed.

Another object is to provide a new and improved microanalyzer having a scanning system that provides for specimen analysis during scanning.

Another object is to provide a new and improved microanalyzer having a scanning system for scanning across a specimen in different directions.

In an embodiment of this invention, an electron beam probe having a deflection system is operated in synchronism with a display apparatus. Control of the beam deflection system permits adjustment of the size and position of its scanning raster. Thereby, a search raster for the electron beam is available under operator control. The display apparatus presents a magnified image of the specimen being scanned.

Controls are provided to permit accurate analysis and measurements at selected points of the specimen and display of the measurements at the same time as the scanning for over all image display purposes.

Other controls permit line scanning of a selected portion of the specimen in any desired direction.

The foregoing and other objects in this invention, the features thereof as well as the invention itself, may be more fully understood from the following description when read together with the accompanying drawing, in which:

FIG. 2 is a block diagram of the system of FIG. 1 illustrating various controls in greater detail;

FIG. 5 is a schematic circuit diagram of a vertical deflection generator and associated controls used in the system of FIG. 2;

FIG. 6 is a schematic circuit diagram of various controls used in the system of FIG. 2 including the vertical search raster size and position control;

FIG. 7 is a schematic circuit diagram of the horizontal deflection generator of the system of FIG. 2 and associated controls;

FIG. 8 is a schematic circuit diagram of a vertical drive circuit and associated controls used for the electron beam column;

FIG. 12 is a schematic circuit diagram of a gain and centering control circuit that may be used in the circuit of FIG. 10;

FIG. 13 is a schematic circuit diagram of a flip-flop that may be used in the circuit of FIG. 6;

FIG. 14 is a schematic circuit diagram of a modification of the circuit of FIG. 5; and FIG. 15 is a schematic circuit diagram of a modification that may be used in the circuit of FIG. 6 or FIG. 7.

In the drawing corresponding parts are referenced by similar numerals throughout.

Figure 1:
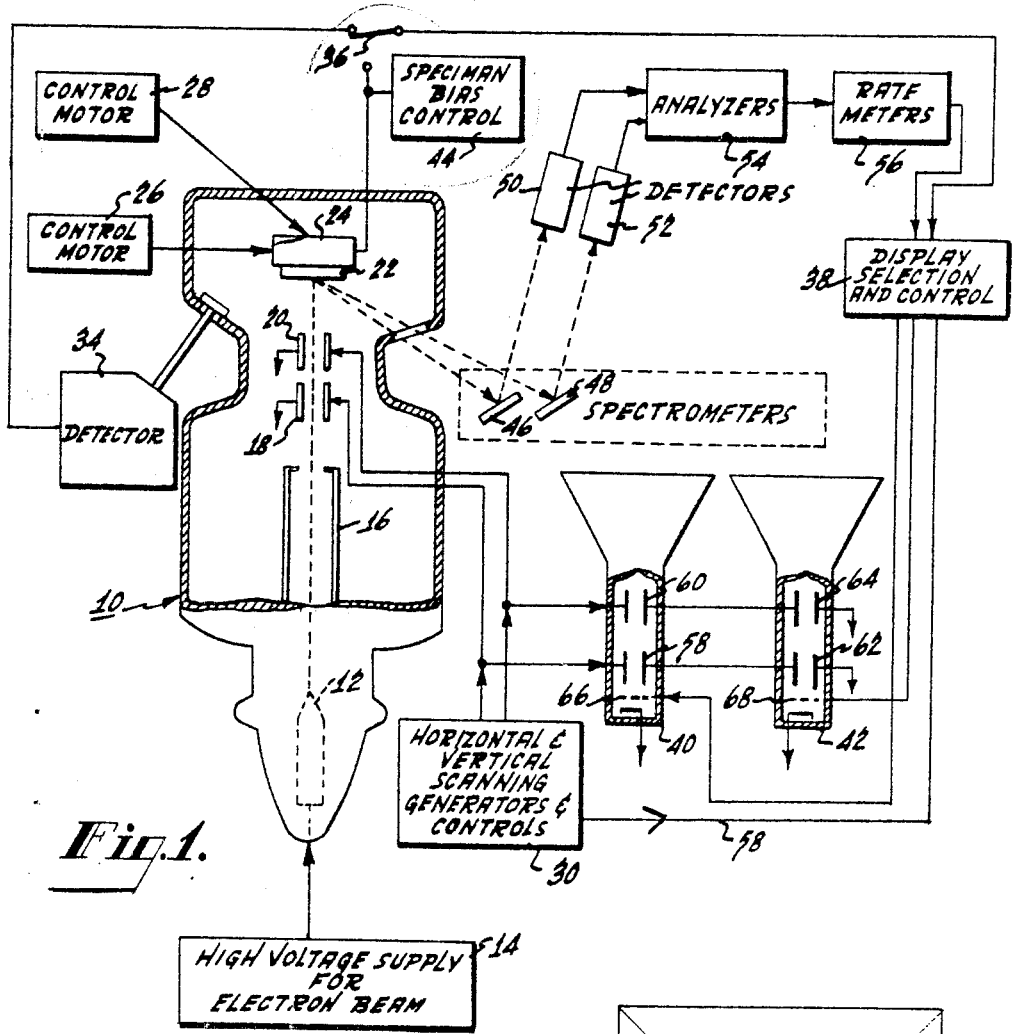
FIG. 1 is a schematic and block diagram of an electron probe system embodying the invention.

In FIG. 1 a generalized block diagram of the scanning system of this invention is shown. The electron probe is formed as an electron beam in a column 10 that is oriented vertically. The beam is emitted from a filament 12, which is energized by a suitable high voltage supply 14 adapted to supply about 50 kilovolts. The electron beam is formed by electron optics 16 such as electron lenses, stigmators, and the like. Suitable electron optics for this purpose are known in the art. The electron beam passes through two sets of deflection plates 18 and 20 which respectively deflect the beam in transverse directions. The beam is directed to a specimen 22 supported on a specimen stage 24, which is adapted to be moved in transverse directions by separate control motors 26 and 28. The stage 24 is also adapted to be moved axially along the column 10 by another control motor (not shown).

The deflection plates 18 and 20 are separately energized by horizontal and vertical scanning generators shown generally by the block 30. The scanning raster may be of the order of two millimeters square, and the specimen may be many times that in area. The control motors 26 and 28 move the specimen 22 to different positions so that different areas of that specimen may be scanned by the electron beam.

High velocity electrons reflected from the specimen 22 are directed to a phosphor element 32 at the side of the column, and the light emitted from the phosphor is directed to a detector 34 which may be a photo multiplier. The electrical signal derived as an output from the detector 34 is characteristic of an electron image of the specimen 22, and this output is supplied via a switch 36 and a control system 38 to one or the other of two display tubes 40 and 42. A voltage bias may be applied to the specimen 22 by a bias control 44, and the specimen current may be used as a specimen image signal that may be selectively displayed via switch 36 and the control 38 on the display tubes 40 and 42.

Some of the electrons irradiating the specimen 22 penetrate that specimen and excite the emission of X-rays. These X-rays are directed to spectrometer crystals 46 and 48 and reflected to separate detectors 50 and 52, such as scintillation or Geiger-Muller counters. The outputs of the detectors 50 and 52 may be in the form of pulses and are supplied to scalers or analyzers 54 (such as pulse-height analyzers) the outputs of which are transmitted via rate meters 56 to the control 38 for selecting the display on the tubes 40 and 42. Suitable arrangements for deriving appropriate electrical signals from the X-ray emission are well known. Pen recorders (not shown) may be provided for charting these signals in addition to using them in the image display of tubes 40 and 42.

The display tubes 40 and 42 have deflection systems 58, 60 and 62, 64 which are deflected in synchronism with each other and with the deflection plates 18 and 20 of the column 10 by the scanning generators 30. The terms "horizontal" and "vertical" are used to refer conveniently to the usual orientations of the scanning in a display tube; but no restriction as to actual positions of use is intended thereby.

In operation, electron images of the specimen being scanned are provided by the reflected electron currents and by the specimen currents, one of which may be selected by the switch 36. In addition an X-ray image of the specimen is represented by signals from the spectrometers 46 and 48 and the detectors 50 and 52. These various image signals may be selected via the control 38 and displayed by intensity modulation of the display tubes 40 and 42 via their grids 66 and 68. For example, one of the tubes may display an electron image and the other an X-ray image, or different kinds of X-ray images may be displayed by the two tubes 40 and 42. Various other arrangements for displaying information about the specimen 22 will be apparent from the following description. For example, the signals to be displayed may be applied via a connection 58 to the scanning generator control 30 for deflection of the display-tube beam. By proportional deflection of its beam one or the other of the display tubes 40, 42 may be used to indicate measurements of the characteristics of the specimen 22 as well as the images thereof.

In FIG. 2, the control circuitry is shown in a block diagram. A vertical deflection generator 70 supplies deflection signals through a connection 72 to a selection and control circuit 74, and via the connection 76 to signal selector switches 78. The deflection signal is applied to vertical drive circuits 80, which drive, via quadrant selectors 82, the vertical deflection plates 60 and 64 of the two display tubes 40 and 42. The vertical deflection signals passed by the selection and control circuitry 74 are also applied to a control 84 for setting the size and position of the vertical raster in the beam column 10. The output of the vertical control 84 is applied to a vertical drive circuit 86 and then via another quadrant selector 88 to the vertical deflection plates 20 of the beam column 10.

Various operational controls 90 are associated with the vertical deflection generator 70. These controls 90 permit the operator to start and stop the deflection, and to select the desired mode of operation. In addition fast and slow scan controls 92 are provided for the deflection generator 70, and these controls 92 determine the rate of deflection. A line number control 93 sets the numer of scanning lines in a raster frame. A sampling time adjustment and control 94 is associated with the vertical deflection generator 70, and this determines the length of time a stationary spot is positioned at a certain point on the specimen in order to provide an adequate irradiation of the specimen for accurate measurements.

The horizontal deflection generator 96 supplies a deflection signal through the selection and control circuitry 74 and the connection 98 to the time base selector 100, and thence to the horizontal drive circuit 102, through the quadrant selectors 104, to drive the horizontal deflection plates 58 and 62 of the display tubes 40 and 42.

The horizontal deflection signal passed by the selection control 74 is also applied to a horizontal search raster size and position control 106 which is ganged to the vertical control 84, as indicated by the broken-line connection 107. The search raster control 106 supplies a deflection signal to the horizontal drive circuit 108, and thence via the quadrant selector 110 to drive the horizontal deflection plates 18 of the beam column 10.

The horizontal deflection generator 96 also has associated with it operational controls 112 and fast-slow controls 114 (ganged to the controls 92) in a manner similar to those controls 90 and 92 for the vertical generator 70.

The vertical deflection signal is supplied to an adjustment circuit 116 for purposes of line-scan operation. The line-scan adjustment circuit 116 supplies two output lines 118 and 120 for the respective vertical and horizontal deflection signals for such line operation. When selected by the selection and control circuitry 74, these line signals are supplied to the connections 76 and 98 for application to the selector switches 78 and 100 and to raster size and position controls 84 and 106.

The detectors and meters discussed above with respect to FIG. 1 are shown in FIG. 2 collectively by the block 122. These detectors and meters supply image signals to image selector and drive circuits 124 for driving the display tube girds 66 and 68. Thus, with the horizontal and vertical deflection signals supplied through the selector switches 78 and 100 to drive the deflection plates of the display tubes 40 and 42 in synchronism with the beam column 10, various selected images may be displayed on these two tubes.

Figure 3:
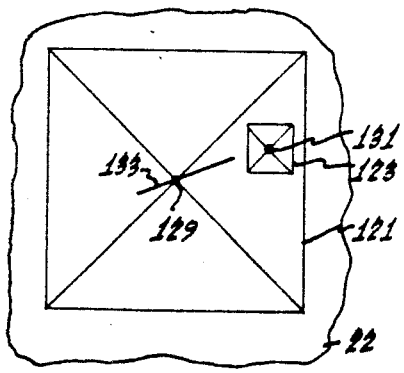
FIGS. 3 and 4 are schematic diagrams of the deflection rasters in the beam column and in the display tubes.
Figure 4:
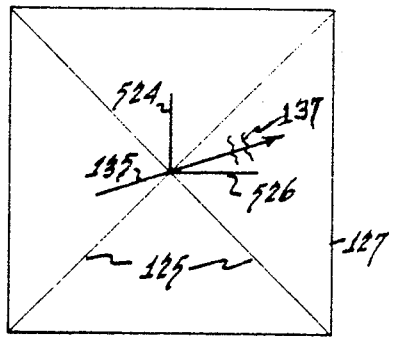

In operation, the size of the raster scanned across the specimen by the beam of the column 10 is determined by the settings of the raster size controls 84 and 106. The ratio of the raster of the display tubes 40 and 42 to the raster size in the beam column 10 determines the magnification provided by the system. In FIG. 3, the outlines of two beam rasters 121, 123 of different sizes and different centers are shown superimposed on a portion of a specimen 22. Diagonal lines of the rasters 121 and 123 are added to indicate the relationship to the cross-hairs 125, 125 of the raster 127 (FIG. 4) on the face of a display tube 40 or 42. The size of the column raster 121 may be reduced to any desired value, say to that of raster 123 (and smaller to essentially point size) and, thereby, increase the magnification in the display image (the raster of which is held constant in size)

The size and position controls 84 and 106 also permit adjustment of the center point of the raster, for example, adjustment from the point 129 to point 131. With this position control, the raster's position on the specimen can be adjusted to any location within the maximum specimen raster 121. The size and position adjustment permits a scanning search to be performed over the face of the specimen, and the term "search raster" is used hereinafter to indicate this characteristic of the beam raster.

In another mode of operation, the vertical deflection signals are used to generate a line scan deflection both in the beam column 10 and in the display tubes via the adjustment circuit 116, and by appropriate switching in the raster and line-scan selection control 74. A scanning line 133 in the beam column is displayed as line 135. It is desirable to be able to set the scanning line 135 to be at a certain angle with respect to a certain feature (say at right angles to a fault 137) of the specimen 22 and to approach it from either side.

In the line-scan mode of operation the quadrant selectors 82 and 104 for the display tubes and the selectors 88 and 110 for the beam column are operated together by ganging as indicated in the figure to select any of the four quadrants for the development of the line scan. That is, the scanning line is developed toward any one of the four quadrants as selected. Expressed otherwise, the quadrant elector determines whether the scan is developed to the left or to the right and upward or downward. The raster and line-scan control 74 operates to alternate the line scan with a full raster scan so that the scanning line may be superimposed on a specimen image, the latter being retained for viewing by a display tube phosphor of sufficiently long persistence.

In addition to image display, each of the display tubes 40 and 42 may be used for displaying amplitude measurements of the individual specimen signals. For purposes of such display, the detector and meter signals are supplied to converter circuits 126 which develop suitable deflection signals characteristic of the specimen signal amplitudes, which deflection signals are supplied via the selector switch 78 to the drive circuits 80 for application to the vertical deflection plates 60 and 64. The selector switches 78 determine which mode of operation each of the display tubes is to operate in, whether signal-amplitude, image display, or a combination of both. When in the signal-amplitude display mode, the selector switches 78 determine which of the signals from the detectors and meters are being displayed.

For various other modes of operation such as a test apparatus when setting up or maintaining the equipment, the horizontal deflection plates of display tubes 40 and 42 receive different time bases from the selector switches 100. Thus, via connections 128 and 130, the horizontal and vertical deflection signals may be supplied directly to the horizontal deflection plates of the display tubes without subjecting them to the control of the selection circuitry 74. Additional connections 132 and 134 can supply other deflection signals from additional time base generators 136.

A number of other features of control and operation of the apparatus are provided. These are discussed in connection with the following more detailed description of this invention.

A vertical deflection generator embodying this invention is shown in FIG. 5. It includes a cathode follower circuit 140 used as a constant current source. The cathode follower 140 is made up of two triode sections 142 and 144 with the cathode of the first triode 142 connected to the anode of the second 144. The second triode 144 is connected at its cathode through a variable resistor 146 and a plurality of fixed cathode resistors 148 to a scan-time selector switch 150-1 having fixed contacts at the junctions of the resistors 148. The selector switch 150 has several levels, and the level referred to is indicated by the numeral added to the reference numeral 150. This convention is also followed for other switches having several levels. The pole of the selector switch 150-1 is connected to the fixed contact 152 of a relay switch 154-1, the pole of which is connected to fixed contacts (positions 3 and 4) of an operating-mode selector switch 156-1. The other contact positions 1 and 2 of that selector switch 156-1 are connected to a reference voltage indicated by the conventional ground symbol.

The pole of the selector switch 156-1 is connected to the pole of another selector switch 158-1, which switch is multilevel and functions to select a display or recording (fast or slow) scanning speed.

One fixed contact 160 (the "display" position) of the selector switch 158-1 is connected to a terminal of a relatively small capacitor 162, the other terminal of which is returned to ground. The other contact 164 (the "record" position) of the selector switch 158-1 is connected via a resistor 166 to a plurality of capacitors 168 in parallel, which are also returned to ground. The resistor 166 is also connected to a selector switch 170 which has three contact positions. In one switch position, the selector switch 170 is connected out of circuit; in a second position, the selector switch connects a third capacitor 178 in parallel with the capacitor 168. In the third position, the selector switch 170 connects a fourth, larger capacitor 180 in parallel with the capacitor 168. Thus, the "record" position of switch 158-1 connects a value of capacitance into the circuit which is determined by the setting of switch 170. This latter switch has the effect of determing the number of horizontal scanning lines within a raster, as is explained below.

The pole of the mode-selector switch 156-1 is also connected to the grid of a triode section 182 connected as a cathode follower, the cathode of which is connected to the grid of another triode section 184 also connected as a cathode follower. An adjustable cathode-resistor tap of the cathode follower 184 is connected to the grid of still another cathode follower section 186, which has an adjustable cathode resistor network 188 to provide a tap that feeds the cathode resistor of an amplifier 190. The grid of amplifier 190 is biased by an adjustable resistor network 192 at a constant potential. The anode of amplifier 190 is connected directly to the anode of tube 142 and shares a common anode resistor 194 with that tube.

The other fixed contact 196 of relay switch 154-1 is connected to the cathode of a cathode follower 198, the grid of which is connected to a potentiometer 200.

In operation, the adjustment of the potentiometer 200 determines a discharge level for the capacitor 162 (or the capacitors 168 depending upon the setting of the selector switch 158-1), and assuming mode switch 156-1 is in mode position 3 or 4. The discharge of the capacitor 162 takes place when the relay switch 154-1 is in the position illustrated in FIG. 5.

The switch 154-1 is actuated to engage fixed contact 152 when the vertical deflection voltage is generated. The cathode follower 140 supplies an extremely constant current which is fed via the selector switch 150-1 and the relay switch 154-1, connected to contact 152, through the selector switches 156-1 and 158-1 to the capacitor 162 (or 168, for the other position of switch 158-1). The voltage at the upper terminal of capacitor 162 is positive-going and extremely linear due to the constant nature of the current supplied thereto. The voltage across the capacitor 162 is supplied to the grid of cathode follower 182 and, thereby, to cathode followers 184 and 186. The voltage at cathode follower 186 is supplied to the cathode of amplifier 190 which is adjusted to provide overall unity gain in the feedback loop from the capacitor 162. The voltage at the anode of amplifier 190 is positive-going just as the voltage at the upper terminal of the capacitor 162. Due to the unity gain of the cathode-follower series 182 to 186 and amplifier 190, the voltage at the anode of tube 142 rises at the same rate as the voltage across the capacitor 162. As a result, the voltage across the overall cathode follower current source 140 is maintained constant to insure extreme linearity of the current supplied by that source 140. This linearity of the current source is insured with the illustrated circuit over a vertical deflection range from the normal television rate on the one hand to extremely slow scans ranging from 7 to 75 minutes on the other hand.

The variations in scanning time are determined by a number of adjustments, the principal one of which may be considered to be that of selector switch 150-1 which varies the resistance of the current source 140, and, accordingly, the value of the charging current. Other adjustments provided by the selector switches 158-1 and 170 will be discussed hereinafter.

The cathode follower stages 182, 184, and 186 insure complete isolation of the charging capacitors 162 or 168 from the feedback circuit and from the output of the deflection generator. This output 202 is taken at the adjustable tap on the cathode resistor of cathode follower 184. The output 202 is connected to the grid of the input section 204 of a differential amplifier. The other section 206 of the differential amplifier (connected to the input 204 by a common cathode resistor) has its grid connected to a potentiometer 208'. The setting of the potentiometer 208 is monitored by a connection to the grid of cathode follower 219, the cathode of which is connected via an adjustable resistor and a switch 215 to a voltmeter 217. The other side of the meter 217 is connected through an adjustable resistor to the grid of the input triode 204. The meter 217 compares the level of the sawtooth voltage being generated with the ultimate sawtooth level set by the potentiometer. Thereby, the meter 217 indicates the state of the scan; this is especially noteworthy in connection with slow scans of the order of an hour or more.

The anode impedance of the output section 206 of the differential amplifier includes the relay coil 154 which is connected through a normally-open manual start switch 208, a normally-closed manual stop switch 210, and a resistor 213 to a source of operating potential. The relay coil 154 operates pole 154–2 between an open-circuit contact 211 and a contact 212 that connects the pole 154–2 across the start switch 208. The relay 154 operates another pole 154–3 between a contact 214 connected to one terminal of the coil 154 and another contact 216 connected via a discharge-path resistor 219 to terminals of a plurality of capacitors 220. The pole 154–3 is connected to the pole 218 of a selector switch that connects one of a plurality of different size capacitors 220 in circuit with the discharge resistor 219. The capacitors 220 are also connected in circuit with a charging resistor 222 to a fixed contact of a fast-slow selector switch 158–2, the pole of which is connected to the terminal of coil 154 at the anode of tube 206. The other contact of switch 158–2 is open circuited. Another switch 158–3 in one position is connected between the fixed contact of the stop switch 210 and the fixed contact of the start switch 208. The other fixed-contact position of the pole 158–3 is an open circuit.

In operation, the section 206 of the differential amplifier tends to be normally on. And the section 204 is normally off. Operating potential for the section 206 is supplied via the coil 154 and the scan-start switch 208 when it is operated (or via the switch 158–3 in the illustrated by-passing condition). Prior to operation of the scan-start switch 208, the coil 254 is in a deenergized state, and the relay switch 154–1 discharges the capacitor 162 to the level set by the potentiometer 200. This discharge level is essentially the voltage applied to the grid of the input section 204 of the differential amplifier, so that the input section 204 tends to be biased to non-conduction.

When the scan-start switch 208 is operated, the bias on the section 206 of the differential amplifier is effective to render that section conductive and to energize the relay coil 154. The relay pole 154–2 is switched to the contact 212 to bypass the start switch 208 and latch the coil 154 in its energized state. At the same time, the pole 154–1 is connected to the contact 152 to pass current from the source 140 to the capacitor 162 (via selector switch 156–1 in position 3 or 4) to start the generation of the vertical deflection waveform. At the same time, the pole 154–3 is connected to the contact 216 to provide a discharge path for any charge in the capacitors 220 through the resistor 219 connected to that contact 216.

When the capacitor 162 is charged to the voltage set by the potentiometer 208', the voltage at the output 202 supplied to the differential amplifier input 204 is at the same level as that setting 208', and conduction is switched from the output section 206 to the input section 204. At that time, the coil 154 is deenergized, and the poles associated with that relay coil 154 are switched to their normal positions. Thus, the pole 154–1 is switched to contact 196 to discharge the capacitor 162 to the level set by the potentiometer 200. As the voltage across the capacitor 162 starts to fall, the voltage at the input 204 of the differential amplifier likewise starts to fall. Therefore, the tube section 206 starts to conduct.

However, by means of the time-constant circuit supplied by the capacitors 220 and resistor 222, the re-energization of the relay coil 154 is prevented for a certain time. That is, the circuit via the closed stop switch 210, the relay switch 158–3, the relay switch 154–3, the selector switch 218, the capacitor 220 and resistor 222 bypasses that relay coil 154. Until the voltage built up across the capacitor 220 is sufficient to operate the relay coil 154, it remains deenergized. When the selected time has passed, as determined by the resistor 222 capacitor 220 time constant, the relay coil 154 is reenergized, and the poles 154–1, 154–2, and 154–3 are operated in a manner previously described to initiate generation of the next sawtooth cycle.

The waveform generated by the vertical generator is indicated adjacent the output connection 202. This waveform includes the usual relatively slowly rising portion 226, which is the sawtooth portion of the waveform. The sharp fall in voltage 228 is the return trace of the sawtooth waveform, and the pause 230 is the condition achieved by means of the time delay circuit 218, 220, and 222.

In the slow scan (or record) mode of operation, the selector switch 158–3 is connected to the open contact 224, and the scan start switch 208 is not bypassed. The latter switch 208 is needed to start the scan, and it reopens once started. Thus, the scanning operation does not restart automatically once it has terminated. Under those circumstances, the delay circuit 220, 222 is not operating. Accordingly, there is only a single sawtooth voltage generated of the form 226 and 228.

The sawtooth voltage 226 generated on the output line 202 is fed into the circiutry of FIG. 6. The line 202 is connected via the fixed contact 232 to the pole 234–1 (operated by the relay coil 234) and via that pole to the fixed contact 236 of a relay pole 238–1 (energized by the relay coil 238). The pole 238–1 is connected to the grid of a cathode follower 240 having an adjustable tap 242 on the cathode resistor. This tap 242 is connected to an output line 244 and also to one end of an attenuator network 245. The attenuator network 245 includes six resistors connected in series, with the fixed contacts of a selector switch 246–1 connected to junctions of the resistors starting with the input of the first resistor. The last resistor of attenuator network 245 is connected to the positions 1–6 of a second level of that selector switch 246–2. The pole 246–2 is connected to ground. The selector position 7 of the switch 246–1 is connected to a variable tap 248 of a resistor connected between the connection 242 and the selector position 7 of the switch 246–2. The selector position 8 of both switch levels 246–1 and 246–2 are grounded or off positions. By this arrangement, different portions of the deflection voltage which appears at the connection 242 may be tapped off by the selector switch pole 246–1. In the selector positions 1–6, the attenuation is in fixed steps. In the selector position 7 the variable resistor 248 is connected as the attenuator network in place of the network 245 and a continuous variation in tap off may be provided.

The selector switch 246–1 is connected through a first adder resistor 250 to an output connection 252. The other adder resistor 254 of the adder receives a voltage from a potentiometer 256 which may be manually adjusted. The adjustment of the potentiometer 256 provides a direct voltage level for the deflection signal, and this direct voltage is added to the attenuated voltage from the selector switch 246–1. The combined voltage is derived at the junction 252 and the output connection 258, and it is used to drive the column deflection plates. The voltage on the output connection 244 is used to drive the vertical deflection plates of the display tubes 40 and 42. The difference between the voltages at lines 244 and 258 comprises, first of all, the reduction in voltage by the attenuator 245 (or 248) together with a D.-C. level which is supplied by the potentiometer 256. The latter adjustment serves to adjust the column raster up or down.

The connection 202 from the vertical generator is also connected to two potentiometer resistors 260 and 262. The slide taps for these potentiometers are ganged together. One of the taps 264 is connected to the fixed contact 266 of the relay 234–1. The other slide 268 is connected via the connection 270 to the horizontal attenuator described below in FIG. 7. Energization of the relay coil 234 is via the pole 156–2 of that selector switch. Positions 1, 2 and 3 of that switch are connected to ground and position 4 is connected to a positive operating potential. The other terminal of the coil 234 is connected to fast-slow selector switch 158–4. In the slow position of that switch 158—4 (for positions 1–3 of selector 156–2) the coil 234 has ground connected across both terminals and it is deenergized; this condition also exists in the fast position of that selector switch 158–4.

However, for position 4 of the selector 156–2, the coil 234 is continuously energized with switch 158–4 in the slow position. When the latter is in the fast position, the energization of the coil 234 depends upon the state of a flip-flop 272. The flip-flop 272 is a bistable multivibrator of the triggerable type (also known as a binary counter) in which the inputs are supplied via capacitor 274 from the vertical sawtooth generator connection 202. That is, upon each retrace 228 of the vertical waveform, the flip-flop 272 is triggered to change state. On alternate states, the switch pole 158–4 is connected to a conducting tube of the flip-flop 272, which has the effect of energizing the coil 234. In the other alternate states of the flip-flop 272 the associated tube therein is non-conductive, and the coil 234 is deenergized. Thus, in operation, the pole 234–1 on alternate cycles transmits the waveform on line 202 to the fixed contact 236 and, during the other alternate cycles, transmits the waveform from potentiometer slide 264 to that fixed contact 236.

The relay coil 238 is connected at one terminal to ground and at the other terminal through the operating-mode selector switch 156–3. Ground potential is connected to positions 1 and 2 of that selector switch 156–3. Position 3 of that selector switch is connected through relay switch 154–4, the normally closed contact of which is connected to a six volt potential and the normally open contact of which is connected to ground. Position 4 of selector switch 156–3 is directly connected to the six volt potential level.

The relay pole 154–5 connects to either of two fixed contacts 276 and 278. These fixed contacts are respectively connected to lamps 280 and 282, other terminals of which are connected to ground. The pole 154–5 is connected to fixed contact 284 of fast-slow selector switch 158–4, the pole of which is connected to positions 3 and 4 of mode selector switch 156–4. The pole of that switch 156–4 is connected to a six volt potential and positions 1 and 2 are open circuited. The fast position of switch 158–4 is open also.

In the slow operating position of 158–4 under the conditions of operating mode 3 or 4, a six volt potential is supplied to one or the other of the lamps 280 or 282 depending upon whether or not relay coil 154 is energized or deenergized, respectively. The latter conditions represent the operating states of the apparatus (scan in progress or scan ready) when operating mode switch 156–3 is in position 3 or 4, and these states are indicated by the relative conditions of the lamps 280, 282.

Circuitry for the horizontal deflection generator and associated controls is shown in FIG. 7. The sawtooth waveform is developed across the capacitor 290 (or 292, for a slow, recording scan), which has one of its terminals connected to ground, and the other terminal connected to a fixed contact of fast-slow relay switch 158–5. The pole of the latter switch 158–5 is connected to the pole 156–5 of the mode selector switch. Positions 1 and 2 of the mode selector 156–5 are connected to ground, and the third and fourth positions are connected to a junction 294 at the cathode of triode 296.

When the triode 296 is switched on periodically by pulses 298 applied to its grid, the capacitor 290 or 292 connected in circuit is charged substantially to the operating potential of that tube. Upon termination of the pulse 298, the triode 296 is cut off, and the capacitor 290 or 292 is discharged through the constant current source made up of two triodes 300 and 302 connected cathode-to-anode in series. The current level from this constant current source is set by variable resistors 304 and a series of resistors 306, different numbers of which may be selectively connected in circuit by way of selector switch 150–2. The pole of this selector switch 150–2 is returned to a negative operating potential level.

In operation, capacitor 290 (when selector switch 158–5 is in the fast position) is periodically discharged via the triode 296 and then charged via the triodes 300 and 302 to develop the sawtooth waveform that is used for the horizontal deflection.

The pulses 298 for switching the triode 296 are varied in their repetition rate depending on whether fast or slow operation is to be maintained and in accordance with different settings within each of those two speed classifications. The pulses for slow scanning are derived from a slow operating multivibrator 308 of the freely running type. This mutivibrator 308 includes two triodes 310 and 312 having cross connected anodes and grids in the usual multivibrator configuration. Thus, the anode of triode 310 is connected to the pole of selector switch 150–3, the fixed contacts of which are connected via different valued capacitors 314 to the grid of triode 312. The grid of triode 312 is connected through different valued biasing resistors 316 to the fixed contacts of selector switch 150–4, the pole of which is connected to ground.

In a similar manner the anode of tube 312 is connected via capacitors 318 and selector switch 150–5 to the grid of triode 310. At the grid, biasing resistors 320 are connected in circuit by means of the selector switch 150–6, the pole of which is connected to the pole 158–6 of the fast-slow selector switch. The fixed contact 322 of the switch 158–6 is connected to a negative biasing potential to maintain the slow multivibrator 308 in the off condition for the fast position of the selector switch 158–6. The slow contact 324, however, is connected to the pole 156–6 of the mode selector switch. Thereby, the fixed contact 324 is connected to the same bias-off potential when the selector switch 156 is in positions 1 and 2, and is connected to ground potential for full operation when that mode switch 156–6 is in positions 3 and 4.

A second freely running multivibrator 326 having a relatively fast repetition rate is similarly constructed of two cross connected triodes 328 and 330. Selector switches 150–7 and 150–8 select the capacitors 332 and resistors 334 connected to the grid of tube 330. Similarly, the selector switches 150–9 and 150–10 select the capacitors and resistors, respectively, connected to the grid of tube 328. In the slow multivibrator 308, six steps of repetition rate are provided by the six capacitors 314 (318) and six resistors 316 (320) in combination. However, in the fast multivibrator 326, only two different repetition rates are provided by only two capacitors and resistors corresponding to the positions 1 and 2 of the selector switches 150–7 through 150–10. The positions 3–6 of the latter selector switches are all connected to position 2 of the associated switch for this reason. The pole of switch 150–10 is connected to ground; however, the pole of 150–8 is connected to the pole 158–7 of the fast-slow selector switch. In this case, the contact 336 corresponding to slow operation is connected to the negative bias-off potential, while the contact 338 corresponding to fast operation is connected to the pole of mode selector 156–6. Thereby, the fast multivibrator 326 is rendered operative in positions 3 and 4 of the mode selector 156–6.

In operation, the scanning time selector switches 150–3 through 150–10 in the multivibrator are all ganged together and also ganged to the charging current selector 150–2 which selects the cathode resistor for tube 302. Thereby, the switch 150–2 selects the appropriate charging currents that will be consistent with the repetition rate of the appropriate multivibrator 308 or 326.

Pulses generated at the anode of tube 328 are supplied via lead 340 to one fixed contact of the selector switch 158–8 for fast-slow selection. The slow repetition pulses are taken from the anode of tube 310 via the connection 342 to the other fixed contact of fast-slow selector 158–8. The pole of the fast-slow selector 158–8 is connected to the grid of cathode follower 344, the cathode resistor of which is adjustably tapped to the grid of the discharge tube 296 of the sawtooth generator. The cathode of tube 344 is also capacitor coupled to another cathode follower 346, the output 348 of which is used to provide a blanking signal for the display tubes on the horizontal retrace.

The sawtooth waveform generated across the capacitor 290 (or 292 depending upon the setting of the selector 158–5) is supplied to the grid of cathode follower 350, the adjustable cathode tap 352 of which is set to supply the horizontal sawtooth deflection voltage. This voltage may be monitored via the connection 354 which is connected to the display tubes as described hereinafter.

The horizontal sawtooth developed at tap 352 is also supplied to a fixed contact 356 of relay switch 234–2. The other fixed contact 358 thereof receives the line-scan deflection signal via the connection 270 (from FIG. 6). The relay pole 234–2 is connected to one fixed contact of relay 238–3, the other fixed contact of which is connected to ground. The pole 238–3 is connected to the grid of cathode follower 360. The adjustable tap 362 on the cathode resistor of cathode follower 360 is connected to an attenuator 364. The attenuator includes a plurality of resistors 366 connected in series with the fixed contacts of selector switch 246–3 at their junctions. The positions 1–6 of this selector switch correspond to those of 246–1 in the vertical generator attenuator of FIG. 6. The position 7 of the selector switch is a tap on a variable resistor 368 which may be used in place of the resistors 366 to provide a continuous adjustment of the attenuation. The selector switch 246–4 is ganged to switch 246–3 to provide the ground return for the corresponding position of the selector switch 246–3. The switch 246–3 is "off" in position 8 (not shown in FIG. 7).

The selector 246–3 is connected to a resistor 370 of an adder network, the other resistor 372 of which receives a voltage from an adjustable setting on a potentiometer 374. The setting on potentiometer 374 supplies a D.-C. level to the horizontal deflection voltage which permits adjustment of the raster to the left and right as will be explained hereinafter. The shunt capacitors in the resistor network insure appropriate filtering. An output connection 376 at the junction of the adder resistors is used to tap off the horizontal deflection voltage which is used for the column deflection. The connection 378 at the adjustable tap 362 which is the input to the attenuator 364 is used as the connection to the horizontal drive circuits for the display tubes 40 and 42 as is explained hereinafter.

In FIG. 8, the vertical drive circuit 86 for the column deflection plates 20, 20 is shown. The input to the vertical drive circuit is the connection 258, which is the output of the resistor adder network 250, 254 shown in FIG. 6. The signal on connection 258 is the vertical deflection voltage. The connection 258 is to the grid of the input tube 380 of a differential amplifier having a second tube 382 connected with a common cathode resistor to the first tube 380. The second tube grid receives a feedback signal on the feedback connection 384. The output at the anode of the second tube 382 is an error signal equal to the amplified difference between the input and feedback voltages, and this output voltage is fed to the grid of the first tube 386 of an amplifier stage that includes a second tube 388 connected by a common cathode resistor to the first tube 386. The grid of the second tube is biased to a constant potential. Outputs are taken from the anodes of both tubes 386 and 388, which outputs are push-pull and applied to the grids of a second amplifier stage 390 and 392, respectively. These tubes 390 and 392 are also connected together by a common cathode resistor. The output from the second tube anode is supplied to a resistor-capacitor network 394, from an intermediate tap of which the feedback connection 384 is taken. The feedback network 394 takes off a certain percentage of the amplified deflection waveform generated at the anode of the amplifier tube 392. By means of the feedback circuit 384, the voltage at tube 392 tends to follow accurately the deflection voltage supplied on the input connection 258.

The voltage at the anode of amplifier 392 is supplied to the fixed contacts 396 and 398 of relay switches 400–1 and 400–2, respectively, but in one case the lower contact and in the other, the upper contact. The voltage at the anode of triode 390 (in push-pull with that from the triode 392) is supplied to the fixed contacts 402 and 404 respectively of the switches 400–1 and 400–2 but in opposite relationship, respectively. The relay coil 400 is energized via the quadrant selector switch 401 in positions 3 and 4 of that switch, but not in positions 1 and 2. Quadrant selector 401 is ganged to the horizontal quadrant selector switch 417 described hereinafter.

The poles 400–1 and 400–2 are respectively connected to fixed contacts 406 and 408 of relay switches 410–1 and 410–2, respectively. The other fixed contacts of those switches are connected to ground. The poles 410–1 and 410–2 are directly connected to the vertical deflection plates 20, 20 of the beam column.

A horizontal drive circuit 108 is generally the same in construction as the circuit 86 described immediately above. The input to the horizontal drive circuit is the connection 376 from the horizontal resistor network 370 and 372 shown in FIG. 7. The ouput connections 412 and 414 from the horizontal drive circuit 108 carry the horizontal deflection voltages in push-pull, and these connections are made to the fixed contacts of relay switches 416–1 and 416–2 in a manner similar to that described above for the vertical quadrant selector 88. The relay coil 416 is energized via quadrant selector switch 417 in positions 2 and 3 thereof, and left unenergized in positions 1 and 4. The poles 416–1 and 416–2 are respectively connected to fixed contacts 418 and 420 of a relay switch, the other fixed contacts of which are connected to ground. The poles 410–3 and 410–4 are connected to the horizontal deflection plates of the beam column. The relay coil 410 is energized by mode selector switch 156–7 in position 1 thereof, and left unenergized in the other positions.

In operation, the quadrant selector switch 401 and 417 are used during line-scan operation to determine the direction of the line scan. Switch 401 leaves the coil 400 unenergized for quadrants 1 and 2 corresponding to those positions of the selector switch 401. That is, the outputs of the push-pull amplifier 390 and 392 are passed by the switches 400–1 and 400–2 without affecting the phase thereof. However, in quadrants 3 and 4, the quadrant selector switch 401 energizes the relay coil 400 to actuate the switches 400–1 and 400–2 which, in effect, causes a phase reversal of the push-pull voltages that are supplied to the vertical deflection plates 20, 20. In a similar manner the horizontal quadrant selector 417 leaves the coil 416 unenergized in positions corresponding to quadrants 1 and 4 (for a line scan developed to the right), and energizes that coil 416 in positions corresponding to quadrants 2 and 3 to produce a phase reversal (for a line scan to the left).

The coil 410 is left unenergized in positions 2, 3, and 4 of the mode selector 156, whereby the deflection voltages passed by the quadrant selector switches are applied to the deflection plates 18 and 20. However, in mode selector positon 1, the coil 410 is energized and the associated switches are connected to ground, whereby the deflection plates of the beam column are likewise connected to ground potential.

Figure 9:
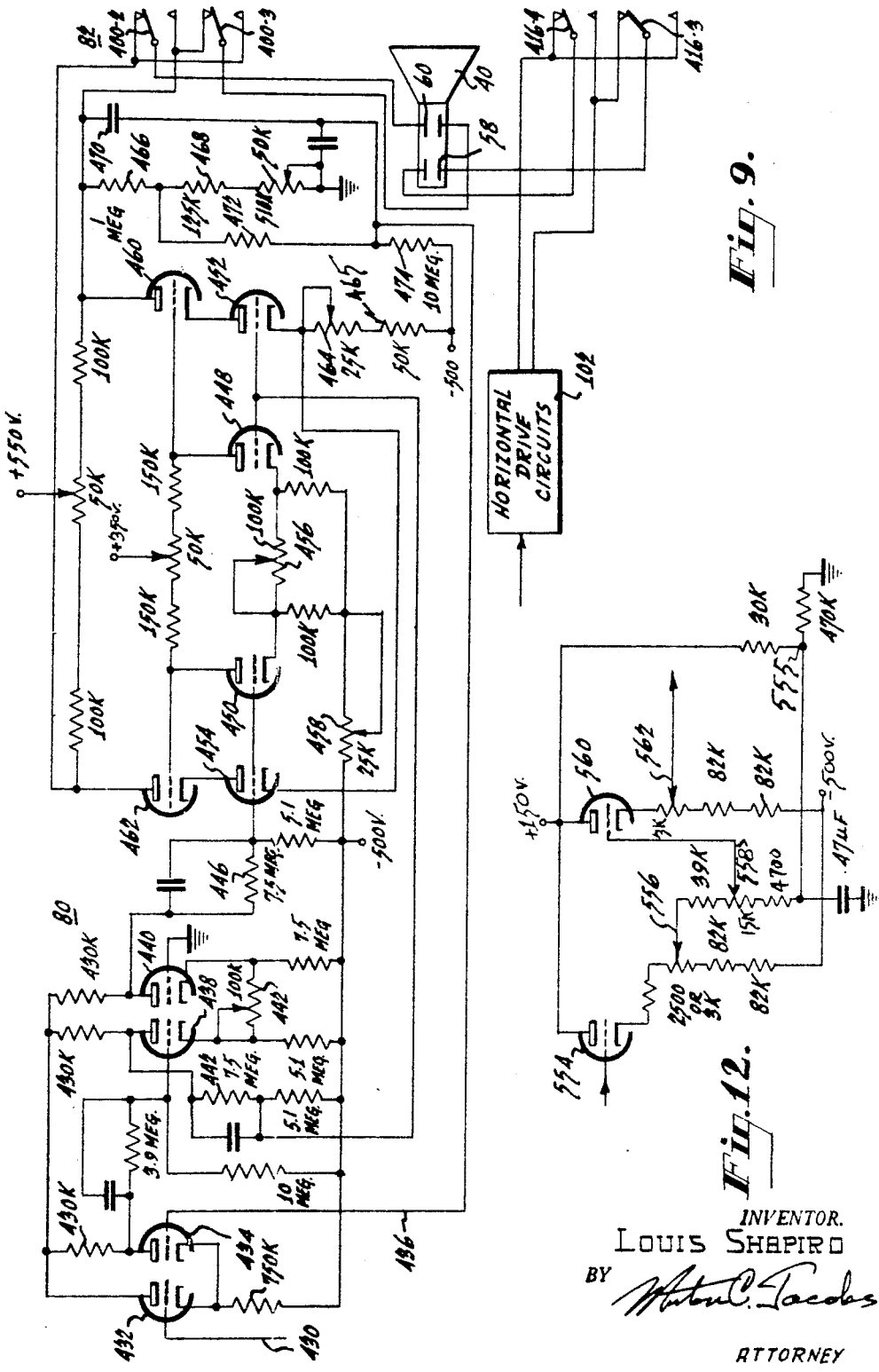
FIG. 9 is a schematic circuit diagram of a vertical drive circuit for the deflection plates of the display tube.

The vertical drive circuits for the display tube 40 are shown in FIG. 9. The vertical deflection signal is fed via the connection 430 to the grid of the input tube 432 of a differential amplifier. The second tube 434 thereof is connected to the first tube 432 by a common cathode resistor, and the grid thereof is connected to a feedback connection 436. The error signal developed at the anode of the second tube 434 is fed to the grid of the input tube 438 of a push-pull amplifier, the other tube of which 440 has its grid connected to ground. The cathodes of the tubes 438 and 440 are connected together by an adjustable common cathode resistor network 442, and at the anodes of these tubes push-pull signals (i.e., double-ended signals) representative of the error signal are developed.

The push-pull signals are fed via resistor capacitor networks 444 and 446, respectively, to the grids of slave amplifier tubes 448 and 450. The grids of the latter tubes 448 and 450 are tied to the grids of driver tubes 452 and 454, respectively, so that these tubes also receive the push-pull signals. The slave amplifier tubes 448 and 450 have their cathodes connected to a common cathode resistor network including a variable resistor 456 by means of which the gain of the amplifier can be adjusted and including a common cathode resistor 458 which can be adjusted to set the D.-C. output level of these tubes. The outputs of the slave amplifiers 448 and 450 are in push-pull at the anodes thereof, and these signals are applied to the grids of second driver tubes 460 and 462, respectively.

The anodes of the tubes 460 and 462 are connected to the fixed contacts of relay switches 400-2 and 400-3 which make up the vertical quadrant selector 82 of the display tube 40. The connections via the switches 400-3 and 400-4 provide polarity reversal of the signals in a manner similar to that described for the switches 400-1 and 400-2, all of which are actuated by the same relay coil 400.

The tubes 460 and 452 are connected in series cathode-to-anode as are the tubes 462 and 454. The cathodes of the tubes 452 and 454 are connected together and to a common cathode resistor 464. The resistor 464 is chosen to have a large value compared to the variations in the impedance of the series connected tubes 460, 452, and 462, 454. As a consequence of this relationship, the sum of the currents in the two parallel pairs of tubes is maintained substantially constant; that is, the current through the tubes 460 and 452 plus the current through the tubes 462 and 454 is constant. The adjustment of the resistor 464 together with resistor 465 provides and maintains absolute D.-C. positioning of the deflection voltages developed at the anodes of the tubes 460 and 462. In this manner, a true push-pull signal at these deflection plates is obtained.

The use of the two tubes 460 and 452 in series permits an economy in the plate voltage requirements for these tubes in that the required voltage swing of 500–600 volts for the deflection plates of the display tube 40 is divided between the two triodes 460 and 452 and similarly between the other two triodes 462 and 454. This permits the use of smaller standard tube types for this purpose. The slave amplifier 448 and 450 drives the grids of the upper tubes 460 and 462 in the opposite direction from the push-pull drive on the grids of the lower tubes 452 and 454, and the gain of tubes 448 and 450 is slightly less than tubes 452 and 454. Thus, as the grid voltage of tube 452 decreases, both the grid and the cathode voltages of tube 460 increase, with a net decrease in grid-cathode voltage. Accordingly, as the voltage across the tube 452 increases, the voltage across tube 460 increases by the same amount, and vice-versa. This has the effect of maintaining an equal voltage division between the two tubes in each cascaded pair. The common cathode coupling of the slave amplifiers 448 and 450 aids in this mode of operation and maintains correctly the above-mentioned equal voltage division.

A feedback, beta signal sampling network includes the series resistors 466 and 468 connected between the plate of the driver tube 460 and ground. A capacitor 470 is connected across the series resistors. Another series resistor combination 472 and 474 is connected between the junction of the resistors 466, 468 and an operating potential. The feedback connection 436 is connected from the junction of the resistors 472 and 474 to the grid of the differential amplifier tube 434. Only one such network is needed as a result of the precise method of developing the deflection voltages in push-pull fashion. That is, the feedback circuit establishes an error signal precisely related to the deflection voltage developed at the anode of the tube 460, and automatically establishes the correct signal for the other deflection voltage at the anode of the tube 462 due to the overall circuit configuration that insures that the sum of the currents in those two tubes is maintained constant.

Similar deflection circuits are used for the horizontal drive circuits 102 for driving the horizontal plates 58 via a similar set of polarity reversing switches 416-3 and 416-4 that are operated together with the beam quadrant selector switches 416-1 and 416-2 of FIG. 8. The ganging of selectors 401 and 416 serves to provide a unitary control for the quadrant selection of the direction in which the line scan is developed.

Figure 10:
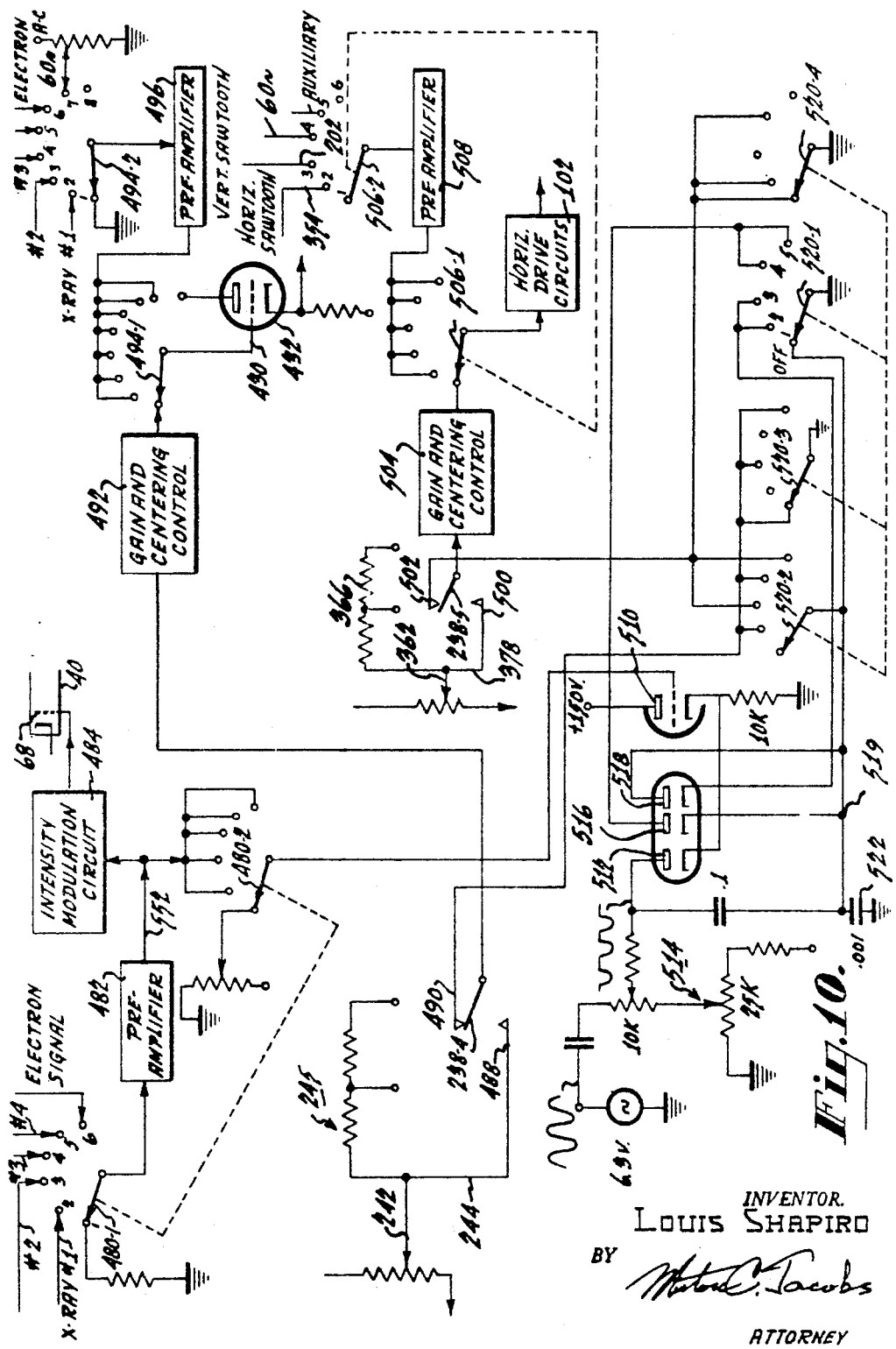
FIG. 10 is a schematic circuit diagram of circuits for selecting image signals and a converter circuit therefor.

In FIG. 10 the circuits for selecting and controlling the image signals are shown. A selector switch 480-1 having six positions receives a fixed signal at switch position 1 via a resistor returned to ground. Positions 2 thru 5 receive different X-ray image signals via different detectors 50 and 52, pulse height analyzers, rate meters, and so on. Position 6 receives the electron image signal which may be derived from the specimen or as a reflected electron signal via the detector 34 (FIG. 1).

The pole of selector switch 480-1 is connected to a preamplifier 482 (a suitable form of which is described hereinafter), the output of which is connected to an intensity modulation circuit 484 which drives the grid 66 of the display tube 40. A suitable form of intensity modulation circuit is described in applicant's copending application, Serial No. 54,988, filed September 9, 1960. The blanking signal (for turning off the display tubes 40 and 42 on retrace) developed on connection 348 (FIG. 7) may also be supplied to the intensity modulation circuit 484 with suitable isolation from the preamplifier 482. However, it has been found that for many purposes the blanking signal is not needed.

The output of the preamplifier 482 is also applied to a second level of selector switch 480-2 and particularly to the fixed positions 2–6. Position 1 of the selector switch 480-2 is connected to a potentiometer for supplying a voltage near ground thereto. The pole of switch 480-2 is either a fixed signal or one of the image signals depending upon the selected position of operation.

The vertical deflection generator output connection 244 from the tapoff 242 is connected to the fixed contact 488 of the relay switch 238-4. The pole 238-4, normally engaged with the other fixed contact 490, is connected through a gain and centering control circuit 492 to position 1 of a selector switch 494-1. The pole 494-1 is connected to the input line 430 at the grid of the first tube 432 of the vertical drive circuit shown in FIG. 9. The other seven fixed contacts of the selector switch 494–1 are connected together and fed from a preamplifier 496 which is connected to the pole of switch level 494–2. Position 1 of switch 494–2 is connected to ground. In this position, normal image display operation is achieved with the vertical deflection signal being supplied via contact 488 of relay 238–4 to the drive circuit input 430.

Positions 2–5 of selector 494–2 are connected to receive different X-ray image signals. Position 6 is connected to receive the electron image singal, and position 7 receives a 60 cycle A.-C. signal from a potentiometer 498. Position 8 is left open for any desired input signal. By means of the gang connection of the switches 494–1 and 494–2, any of the image signals or the 60 cycle signal may be supplied via the connection 430 and the vertical drive circuit to the vertical deflection plates of the display tube 40. Thereby that tube 40 may be used as an oscilloscope to display the varying amplitudes of any desired one of the image signals. Thus, this display tube 40 is used for an oscilloscope display in addition to the aforementioned display of a structural or compositional image of the specimen.

The horizontal generator tapoff 362 and output connection 378 are connected to the fixed contact 500 of the relay switch 238–5, the pole of which is normally connected to the other fixed contact 502. The pole 238–5 is connected to a gain and centering control circuit 504, the output of which is connected to position 1 of a selector switch 506–1. The pole of that switch 506–1 is connected to the horizontal drive circuits 102 in a manner similar to the pole 494–1 of the vertical circuits described immediately above. Thus, when the relay 238–4 is connected to the fixed contact 500, the horizontal deflection signal is supplied through the horizontal drive circuits 102 to drive the horizontal plates of the display tube 40.

For other positions of the switch selector 506–1, different deflection signals are provided. Position 2 of the selector switch 506–2 receives the horizontal sawtooth voltage developed at the connection 354 of the horizontal generator shown in FIG. 7 (the sawtooth voltage at the connection 354 may differ from the deflection voltage developed at the connection 378 in view of the switching that takes place between those two connections as shown in FIG. 7). Position 3 of selector switch 506–2 receives the vertical sawtooth voltage generated at connection 202 of FIG. 5. Position 4 receives a 60 cycle waveform, and position 5 receives an auxiliary sawtooth of a faster rate than that of the horizontal or vertical sawtooth generators. The pole 506–2 is connected to a preamplifier 508, the output of which is connected to the fixed positions 2 thru 6 of switch 506–1. Thereby, any of the desired deflection voltages may be supplied to the horizontal drive circuits to drive the horizontal deflection plates of the display tube 40.

A signal conversion circuit includes cathode follower 510, the grid of which receives the image signal developed at the pole of switch 480–2. The cathode of this cathode follower 510 is connected to the cathode of a diode 512, the anode of which receives a 60 cycle A.-C. signal supplied via an adjustable resistor network 514, that sets the D.-C. level for comparison with the image signal. The waveform developed at the anode of diode 512 is a clipped A.-C. signal with the amount of clipping depending upon the level of the image signal supplied to the grid of the cathode follower 510. Thus, the image signal (developed from one of the X-ray rate meters or from the electron signal) which is essentially in the form of a varying direct voltage is transformed into a modulated A.-C. signal, the amplitude of which corresponds to the amplitude of the rate meter signal. When the rate meter signal is zero, the A.-C. signal is completely clipped by the diode 512. The anode of the diode 512 is capacitor coupled to the cathode of diode 516 and to the anode of diode 518 at the junction point 519. The anode of diode 516 is connected to positions 4 and 5 of selector switch 520–1. The cathode of diode 518 is connected to positions 2 and 3 of that switch 520–1. The other electrodes of diodes 516 and 518 at junction 519 are connected to position 1 (the off position) of switch 520–1, the pole of which is connected to ground. A capacitor 522 is connected between junction 519 and ground, i.e., across the diode 516 or 518 via the switch 520–1. The capacitor 522 discharges through the resistor network 514.

Junction 519 is connected to the pole of switch 520–2, the first fixed position of which is open circuited, the second and fourth positions of which are connected to the fixed contact 490 of relay switch 238–4, and the third and fifth positions of which are connected to the fixed contact 502 of relay 238–5. A third level of the selector switch 520–3 has its first, third, and fifth positions connected to the fixed contact 490 and its pole returned to ground so that the fixed contact 490 is returned to ground in the first, third, and fifth positions of that switch. In a similar fashion, the first, second, and fourth positions of a switch 520–4 are connected to the horizontal deflection fixed contacts 502, and the pole 520–4 is returned to ground so that that contact 502 may be returned to ground in the corresponding positions of the switch 520–4.

In operation, when the switch 520 is in the "off" position 1, the switch 520–3 supplies ground potential to the contact 490, and the switch 520–4 supplies ground potential to the contact 502. Thereby, the voltages supplied to the drive circuits of the vertical and horizontal deflection plates correspond to the fixed ground potential. The gain and centering control circuits 492 and 504 are adjusted to position the beam of the display tube 40 in a central position for those ground potentials. When the relay switches 238–4 and 238–5 are in the lower positions engaging contacts 488 and 500, the vertical and horizontal deflection signals are supplied to drive the deflection plates in the usual manner.

In the second position of switch 520–1 ground potential is supplied via that switch 520–1 to the cathode of diode 518, so that the diode 518 functions to set the D.-C. level at ground for the clipped A.-C. signal. Consequently, a voltage negative-going with respect to ground is developed at the anode of that diode 518 and across the capacitor 522, which voltage is supplied via the switch 520–2 to its position 2 and thereby to the fixed contact 490 of the relay switch 238–4. This negative-going A.-C. voltage, which is proportional in amplitude to the image signal, is used to drive the vertical deflection plates 60 of the display tube 40. In that position, the switch 520–4 supplies a ground potential to the fixed contact 502 of the relay 238–5 so that there is no horizontal deflection supplied to the horizontal plates 58 of the display tube 40. Accordingly, the electron beam of the display tube 40 is deflected (at a 60 cycle rate) vertically along the line 524 of FIG. 4, by an amount proportional to the amplitude of the image signal. Thereby, a line trace proportional to the amplitude of the image signal is presented. As is explained more fully hereinafter, at that time the scanning of the column beam is temporarily halted, and an accurate measurement of a point of the specimen centrally located in the raster is made. This line deflection 524 is a display of that accurate measurement. The capacitor 522 serves, in addition to its effect in the clamping circuit of diode 518, to establish a time constant for any changes in the image signal to cathode follower 510. Thus, the image signal may be in the form of pulses from the detector 50 or 52, and the capacitor 522 would be an integrator for these pulses.

In position 3 of the switch 520–1, the voltage is again developed across the diode 518, but this time it is supplied to the third position of switch 520–2 which is connected to fixed contact 502 and thereby fed to the horizontal deflection plates. In that switch position, ground potential is supplied via switch 520–3 to the fixed contact of relay switch 238–4 and to the vertical deflection plates of the display tube. Accordingly, a horizontal line 526 (FIG. 4) is developed which is proportional to the image signal supplied to the cathode follower 510.

In the third and fourth positions of the switch 520–1, the signal is developed across the diode 516 which is inverted with respect to the diode 518. Accordingly, the voltage developed is positive-going with respect to ground and tends to produce deflections opposite to the deflections 524 and 526 discussed above. The deflection voltages thus developed are supplied to the vertical or horizontal deflection plates accordingly as the switch 520 is in the third or fourth position in a manner similar to that described above. With this arrangement, the switch 520–1 may be used to position the amplitude display line 524, 526 in any direction away from an area of the image under particular observation to avoid interference. Alternatively, each of the positions of selector 520–1 may be used for a different one of the image signals supplied to the selector 480–1 so as to represent those signals by different directions of the lines 524, 526, etc.; for this purpose, the switches 520 and 480 may be ganged. In addition, all four signals may be displayed simultaneously by separately supplying the four X-ray (or the electron) signals to four conversion circuits, one circuit for each X-ray signal, and supplying the converted A.-C. signals in an appropriate time sequence to the proper deflection plates with the required polarities.

The display tube 42 may have associated with it circuits of the type described with respect to FIG. 10 and operating in a similar fashion. For certain purposes, it is desired to use the display tube 42 especially for photographic recording, and therefore it is provided with a relatively short persistence phosphor, while the tube 40 is primarily used for visual display and has a relatively long persistence phosphor. Under such circumstances, the converter circuit consisting of diodes 516, 518 and associated switches may be used only for the visual display tube 40 and dispensed with in the circuits for the recording display tube 42.

Figure 11:
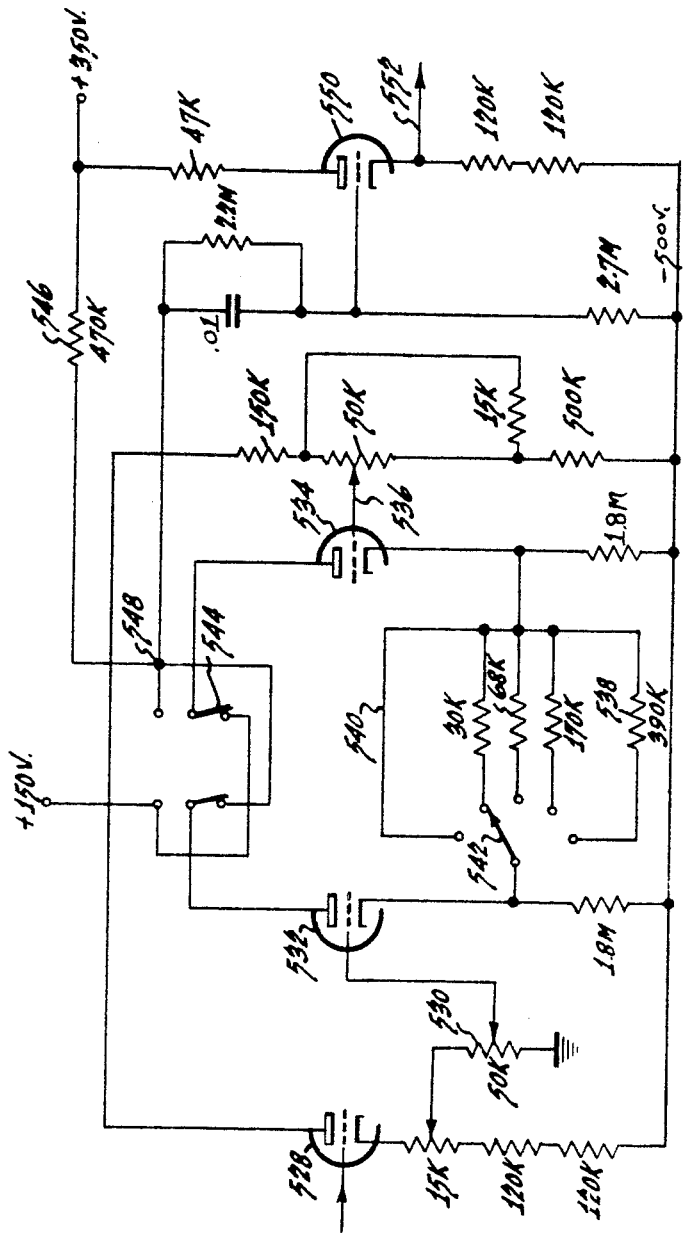
FIG. 11 is a schematic circuit diagram of a preamplifier circuit that may be used in the circuit of FIG. 10.

A suitable preamplifier that may be used for handling the video signals supplied to preamplifiers 482 and 496 is shown in FIG. 11. This amplifier receives an image signal to be amplified at the grid of cathode follower 528, the cathode of which is connected via the adjustable resistor network 530 to the grid of the input tube 532 of a differential amplifier, the other tube 534 of which receives a fixed signal via the adjustment of potentiometer 536. The tubes 532 and 534 have their cathodes connected together to a resistor network which includes individual cathode resistors and a cross cathode network of a plurality of different-valued resistors 538 (and a direct connection 540) which are selected by a selector switch 542 from the cathode of tube 532 to the individual resistors and connection 538 and 540. The selector switch 542 controls the selection of the gain of the preamplifier and the potentiometer adjustment 536 sets the D.-C. level supplied by the preamplifier 482 to the image signal for centering purposes.

The anodes of the tubes 532 and 534 connected to the poles of a double-pole double-throw switch 544 are arranged (in the lower position, as shown, of the switch 544) so that the anode of the tube 534 is directly connected to an operating potential, and the anode of the tube 532 is connected to a different operating potential via an anode resistor 546. The junction connection 548 placed by the switch 544 at the anode of that tube 532 provides the output which is connected to the cathode follower 550 (the cathode of which provides an output connection 552). In the opposite throw position of the switch 544 the output terminal 548 is at the anode of the tube 534. As a consequence, the signal output is inverted when the switch 544 is thrown from one position to the other. In the preamplifier 482 for the image signal, which is used to drive the grid 66 of the display tube 40, the use of the switch 544 has the effect of changing whites to blacks and vice-versa. This switch 544 may be extremely useful in certain instances to display effectively certain image characteristics of the specimen by means of a black signal (in effect) instead of by a white signal. The effect of switch 544 is similar to the photographic reversal of negative to positive or vice-versa.

The preamplifier 496 may be constructed in a manner similar to that of FIG. 11. The preamplifier 508 does not transmit image signals; accordingly, in place of the preamplifier of FIG. 11, it has been found that a cathode follower circuit may be used.

A circuit suitable for the gain and centering control circuits 492 and 504 is shown in FIG. 12. A cathode follower 554 is connected via two adjustable resistor networks 556 and 558 in the cathode circuit thereof to the grid of a second cathode follower 560. An adjustable tap on the cathode resistor thereof provides an output connection 562. The adjustable resistor connection 556 sets the D.-C. voltage level for a zero deflection signal to equal that appearing at voltage divider terminal 555. The adjustable connection 558 determines the amplitude of the deflection signal for the raster deflection. The output connection 562 sets the direct voltage adjustment of the circuit to center the spot of the display tube for zero deflection. When the tap 556 is set at the same voltage level as terminal 555, zero voltage is developed between tap 556 and terminal 555. The voltage at terminal 555 is made a few volts above ground in order to have available ample voltage variation above ground at the cathode of tube 560, which voltage may be needed to ensure proper spot centering in the display tube. The deflection signal applied to tube 554 does not affect the settings for the centering voltage, nor does the gain adjustment 558, so that the two adjustments are essentially decoupled.

The principles of the gain and centering control circuit (FIG. 12) are also incorporated in the preamplifier circuit (FIG. 11). The voltage at the tap 529 is set at ground for an input signal corresponding to zero deflection in the display tube, so that both ends of resistor 530 are at ground. The setting 536 then determines the centered spot in the display tube. The adjustment 530 together with the switch 542 in the additional stage 532, 534 of amplification determine the overall gain for the varying deflection signal independently of the centering adjustment.

The overall operation of the scanning system is described with respect to the different modes of operation that take place for the different settings of the mode selector switch 156. The four positions of this mode selector switch correspond respectively to (1) deflection off, (2) manual spot positioning, (3) scanning operation, and (4) line scanning operation. The various conditions of operation of the circuitry is discussed under each of these four operating modes.

When the mode selector switch 156 is in position 1, no deflection signals are generated. In the vertical deflection generator (FIG. 5) mode selector switch 156–1 at position 1 places the charging capacitor 162 at ground potential and supplies that potential as the output of the deflection generator via the cathode follower 182. In the horizontal generator (FIG. 7) the mode selector 156–5 similarly grounds the horizontal generator capacitor 290 and places the cathode follower output at ground potential. The mode selector 156–6 in position 1 supplies a negative bias-off potential for the slow and fast multivibrators 308 and 326 via the switches 158–6 and 158–7. In FIG. 6, the mode selector 156–2 in position 1 leaves the relay coil 234 deenergized for all conditions of the flip-flop 272. The selector 156–4 is open circuited in position 1. The selector 156–3 in position 1 deenergizes relay coil 238. This results in ground potential being supplied to the relay switch 238–1 via the contact 237 so that the input to the attenuator FIG. 7 relay switch 238–3 is grounded as is the input 362 to the horizontal attenuator network 364. In FIG.

8, the selector 156–7 energizes relay coil 410 when the selector is in position 1. Consequently, the relay switches 410–1, –2, –3, and –4 are all grounded to ground the deflection plates 18 and 20 of the column.

Thus, in this mode position 1, all of the circuitry is stabilized at a convenient operating point ready for normal operation whenever that is initiated. During this time the specimen stage 24 (FIG. 1) may be manipulated. The column beam is centered and all of the electronic deflection control is disabled.

In mode selector position 2, the operation continues with the deflection generators disabled at a stabilized point. Thus, the only operation which can be performed is manual positioning of the spot. That is, the mode selector 156–7 (FIG. 8) deenergizes relay coil 410 in this position so that the relay switches 410 are restored to their connections to the deflection drive circuits. The scanning generators do not contribute to the deflection voltages for the column beam. However, the manual adjustment 256 (FIG. 6) for positioning the center of the raster, that is, the spot, in this condition, is effective to move the column beam up and down with its adjustment. The input to the attenuator 245 remains at ground so that the manual adjustment 256 is in complete control over positioning of the column beam. Similarly, the horizontal adjustment (left-right) of the column beam is via the adjustment 374 with the input to the attenuator 364 continuing at ground potential. Thus, effectively, the only operation in this mode is manual positioning of the deflection beam on the specimen.

With the mode selector 156 in position 3, the scanning operation takes place. The switch 156–1 connects the capacitor 162 in circuit with the relay switch 154–1 for discharge or charge of that capacitor depending upon the state of the relay 154. Thus, the vertical deflection generator is in condition to operate. In a similar fashion, the horizontal deflection generator is enabled by the selector switch 156–5 and –6. With selector switch 158–3 (FIG. 5) in the fast position, the relay coil 154 is energized, to close switch 154–1 to engage contact 152 and start the vertical sawtooth generation. The switch 154–4 (FIG. 6) is actuated to energize the relay coil 238 via selector switch 156–3. Thus, the relay switch 238–1 is actuated and the deflection signal generated on the line 202 is transmitted via that switch 238–1 to the input of the attenuator 245. In a similar manner, the horizontal deflection voltage generated at the connection 352 (FIG. 7) is transmitted via the switch 238–3 to the input of the horizontal attenuator 364. Thus, the connections from the vertical and horizontal deflection generators to the corresponding attenuators are completed.

The setting of the attenuator switch 246 determines the attenuation in both the vertical and horizontal deflection signals. By ganging the switches 246 a constant aspect ratio is maintained as the magnification is varied. The magnification is determined by the ratio of the display raster 127 (FIG. 4) to the column raster 121. By reducing the size of the latter raster 121, the magnification of the displayed image is increased. The position of the raster 123 within the overall beam raster 121 may be set up and down by the manual setting 256 (FIG. 6) which sets the D.-C. level for the vertical deflection voltage. Similarly, the raster 123 may be positioned to the left and right by the setting 374 (FIG. 7). Thus, by the two manual settings 256 and 374 the raster 123 may be positioned to any part of the overall specimen raster 121. This movement of the raster 123 over the specimen may be performed relatively quickly in order to search out areas of the specimen which it is desired to examine at length. When an area of the specimen is located requiring a long detailed examination, the scanning rate may be changed as described hereinafter for this purpose.

Automatic scanning takes place when the selector 158–3 (FIG. 5) is in the fast position to bypass the manual start switch 208. Under those conditions, when the vertical sawtooth reaches a value determined by the setting of the potentiometer 208′, the differential amplifier 204, 206 (as described above) is triggered so that the tube 206 is rendered cut off. This deenergizes the relay coil 154 so that the switch 154–1 starts the discharge of the generator capacitor 162. As the capacitor 162 starts to discharge to the level set by the potentiometer 200, the differential amplifier 204, 206 tends to trigger back in favor of the section 206 being conductive. However, the energization of relay coil 154 is delayed by the time constant circuit 220, 222 as explained above.

The time constant of the circuit 220, 222 is set by the selector switch 218, and this time constant furnishes a sampling time for certain measurements to take place. During the sampling time, the relay switch 154–4 is in the normally closed position so that the relay 238 is unenergized, and the relay switch 238–1 connects the input to the vertical attenuator circuit to ground potential. In a similar fashion, the relay switch 238–3 likewise connects ground potential to the input of the horizontal attenuator network 364. Consequently, during this sampling time, the column beam is positioned at a spot determined by the vertical and horizontal manual settings 256 and 374. This spot of the column beam may be assumed to be the spot 131 at the center of the raster 123. The beam is positioned at that point 131 for the entire period of the sampling time, which period is relatively long compared to the period of irradiation of each spot on the specimen during the normal scanning time.

Also during the sampling time, the relay switches 238–4 and –5 (FIG. 10) are respectively connected to the contacts 490 and 502 so that the vertical and horizontal deflection generators are then disconnected from the vertical and horizontal drive circuits. With the image signal selector switch 480–1 connected to position 2 (or to positions 3–6) an image signal is supplied to the signal converting circuit at the cathode follower 510. Depending upon the setting of the selector switch 520–1, an A.-C. signal proportional to the image signal is supplied to either the vertical switch 238–4 or the horizontal switch 238–5 via the converter circuit as explained above. Assuming the selector 520–1 is in position 2, a line 524 (FIG. 4) is displayed on the display raster 127, the length of which is proportional to the X-ray signal developed by the spot at the point 131.

Due to the relatively long persistence of the phosphor of the display tube 40, the image of the portion of the specimen covered by the raster 123 continues to be displayed by the raster 127 at the same time that the bright line 524 is developed to show by its center point the location of the point under detailed sampling as well as the measurement made as a result of that sampling.

Upon termination of the sampling time, the relay coil 154 is reenergized to initiate a new cycle of the vertical deflection generator. The relay coil 238 is reenergized to connect the vertical and horizontal generators to the respective attenuators. The relay switches 238–4 and –5 (FIG. 10) are reconnected to the fixed contacts 488 and 500 so that the vertical and horizontal deflection generators are again connected to the respective drive circuits.

This cycling may be repeated as many times as desired under the control of the operator. Two different scanning rates are provided for this automatic scanning by means of the setting of the scan time switch 150. That is, the fast multivibrator selector switches 150–7, –8, –9, and –10 (FIG. 7) permit only two variations in fast speed. Other adjustments of those switches during operation of the fast multivibrator are suitably blocked. As explained above, the number of lines in a frame is kept constant by maintaining the ratio of the number of horizonal sawtooths generated for each vertical sawtooth. The number of lines in each frame may be changed by means of selector switch 170 (FIG. 5), which has the effect of changing the time of the vertical scan by increasing the charging capacitance and, thereby, increasing the number of lines per frame.

The selector switch 158 is actuated to the slow position in order to record the image of any portion of the specimen. A relatively short persistence phosphor in display tube 42 adapts that tube for such recording by photographic process. The selector switch 158-1 connects in the slow vertical deflection capacitors, the switch 158-5 connects in the slow horizontal deflection capacitors, and the switches 158-6, -7, and -8 connect in the appropriate multivibrator. Selector switch 158-4, in the slow position, turns on lamp 282 to indicate that the slow scan is ready to start, and after it has started, relay switch 154-5 turns on lamp 280 to indicate that the scan is in progress. The selector switch 158-3 (FIG. 5) unshorts manual switch 208 which allows manual start of the scan cycle to take place and which prevents automatic recycling. That is, at the end of the slow scan, when relay coil 154 is deenergized, the latching relay switch 154-2 breaks the circuit to that coil 154 and prevent recycling. The sampling time circuit, of course, is not operative during the slow scan inasmuch as the operation is for photographic recording and not for visual display. Moreover, the time of irradiation of each area during the slow scan may be the order of time of the sampling. To restart another slow scan, it is necessary to operate the manual start button 208.

Line scanning operation takes place with the mode selector switch in position 4. In this position, the deflection generators are connected to the respective attenuator circuits, and the generators are maintained in operative condition. Initially the operation is described with respect to the fast scan with the selector switch 158 in the fast position. When mode selector switch 156-3 (FIG. 6) is in the line scan position 4, the relay coil 238 is continuously energized so that relay switches 238-1 and 238-3 continuously connect the deflection generators to their respective attenuators.

During the automatic line scan operation, a normal fast raster scan takes place alternating with each line scan operation. Due to the relatively long persistence of the display tube phosphor the two scans are effectively superimposed so that an image of a line scan is displayed together with the image of the specimen derived either from the X-ray or electron signals.

The alternation of a line scan and raster scan operations is under the control of the flip-flop 272 which changes state alternately with successive vertical sawtooth cycles. Assuming, that the relay coil 234 is deenergized on the first cycle resulting in a normal raster scan, on the second sawtooth cycle the coil 234 is energized via selector switch 156-2 (in position 4). The switch 234-1 moved to the contact 266 connects the potentiometer tap 264 into the cathode follower 240 and, thereby, to the attenuator 245. Thus, the deflection voltages for both the display tube and for the column beam are derived from the potentiometer 264. In a similar fashion, the relay switch 234-2 (FIG. 7) connects the potentiometer tap 268 via connection 270 to the output connection 378 and to the attenuator 364. Thereby, the voltages at the potentiometer tap 268 are used for the horizontal deflection voltages in both the display tube and column beam.

The voltage at the tap 264 of the line-scan potentiometer 260 is at ground potential at the lower end of that potentiometer 260. At the upper end of the potentiometer the voltage at the tap 264 is precisely the vertical sawtooth voltage 226. At the intermediate positions of the tap 264, the voltage is likewise linear but at proportionally lower values. The voltage at the tap 268 is similar except that it changes in the opposite direction going from ground at the upper end of the potentiometer 262 to the full vertical sawtooth 226 at the lower end. With the potentiometer taps 264 and 268 at the upper ends of their respective potentiometers having been moved together due to the ganging of these taps, the horizontal deflection voltage remains unchanging at ground, and the vertical deflection voltage changes linearly. Accordingly, the beam in the display tube traces out a vertical line through the center of the raster. The beam in the column also traces out a vertical line with the left-right position of that line being determined by the manual adjustment 374. In a similar fashion, when the potentiometer taps 264 and 268 are at the lower ends of their respective potentiometers, the deflection voltage that is generated is a horizontal line. In the column, this horizontal line is positioned up or down depending upon the setting of the manual adjustment 256. For intermediate positions of the taps 264 and 268, a scanning line is likewise generated, with the direction of the line being determined by the resultant of the horizontal and vertical deflection voltages. Thus, the settings of the potentiometer taps 264 and 268 determine the azimuth of this scanning line. An example of the scanning line is illustrated in FIG. 3 by the line 133 and in FIG. 4 by the line 135. As explained above in connection with FIGS. 8 and 9, the quadrant selectors 82 and 88 are operative through the selector switch 401 so that the scanning line may be generated either in a downward or in an upward direction. Similarly, the selector switch 417 is effective to direct the scanning line to the left or to the right. In this fashion, a particular portion of a specimen may be approached by a line scan from any desired direction.

Following the line scan cycle, the flip-flop 272 is again triggered to deenergize the coil 234 and restore the switch 234-1 to the fixed contact 232. In this position, the vertical generator is connected to the attenuator in the manner described above. The switch 234-2 (FIG. 7) connects the horizontal generator to its attenuator in the usual fashion for developing a full scanning raster. Accordingly, the raster scanning operation is performed. Thus, successive vertical sawtooth cycles result alternately in a scanning raster and in a scanning line, and the two images are displayed one upon the other due to the long persistence of the display tube phosphor.

The line scan operation may also be performed with a slow deflection by operation of the selector switch 158 to the slow position. The operation is generally similar to that described above for the slow scanning operation, and recording by means of the tube 42 is provided. When the switch 158-4 is actuated to the slow position, the relay coil 234 remains continuously energized so that only the line scan deflection is produced. Only one recording line scan is produced under the control of the manual start switch 208 and its latching switch 154-2.

The line scan at a slow rate for recording purposes combines the advantage of a very long period of information accumulation at every point along the line together with a geometric indication of the composition of the specimen. For example, a line scan may provide all the desired information about the specimen such as that which would be obtained by a scanning line travelling normal to a grain boundary. The greatest accuracy for analysis of a specimen sometimes requires a very substantial period of information detection at any individual point on the specimen. Consequently, it may become impracticable to attempt to obtain such information from every point of the specimen. For example, if twenty seconds are required to obtain accurate information from a certain point on the specimen, it would require about a quarter of a million seconds to obtain such information from each part of a five-hundred line picture, or about two and a half days. The recording of a slow line scan makes it possible to obtain accurate detailed information in a reasonable time period. This principle underlies the philosophy of this equipment generally. It is possible to examine any portion of the specimen, however small the area may be and wherever on the specimen the area may be located. Moreover, during the normal scan for visual display of the specimen, the sampling time mode of operation permits an accurate sample of different portions of the specimen quickly and conveniently, together with a knowledge of exactly where the information is coming from.

A flip-flop circuit suitable for use in the block 272 (FIG. 6) is illustrated in FIG. 13. Parts corresponding to those described above in connection with FIG. 6 are referenced by the same numerals. The flip-flop includes two triode sections 570 and 572 connected as a multivibrator. That is, the anode of each tube is cross connected to the grid of the other tube. Connected in the anode circuit of tube 572 is the switch 158–4 when in the fast position and the relay coil 234 energized via the selector switch 156–2 when in position 4. Tube 570 includes an anode resistor in its anode circuit. Negative going pulses passed by capacitor 274 (FIG. 6) appear on connection 574 and are passed by diodes 576 and 578 to trigger the flip-flop tubes 570 and 572 depending upon their previous condition. This operation is the well known flip-flop operation. When tube 572 is conducting, which occurs on alternate input pulses, the relay coil 234 is energized to control the line scan operation described above. In the other alternate states of the flip-flop, tube 570 is conducting, while tube 572 is cut off and the relay coil 234 is deenergized.

In addition to photographic recording, the data may be recorded by means of a strip chart using a pen or by means of magnetic tape recording. Thus, the scans may be recorded by video tape recording techniques and stored for indefinite periods. This method avoids the well known non-linearities inherent in the photographic process and is especially useful for the line scan recording.

It is sometimes convenient to secure a display image at a rate of perhaps two to five frames per second. Although the time constant for accumulation of information at each picture element would be somewhat unfavorable at this frame rate, the gross topographical features are nevertheless visible, and they serve a useful purpose in rapid exploration of a specimen. This more rapid frame rate may also be more convenient due to the characteristics of certain medium or long persistence phosphors that are available for the display tubes. Another factor favoring faster frame rates is that the ambient lighting requirements are also less stringent. For alignment purposes a rapid repetitive raster is convenient in order to secure coarse alignment and focus. In this case a grounded wire grid may be placed in the path of the beam just above the specimen. The resulting image then represents a shadow picture of this wire grid. In addition, the rapid repetition rate operating with the line mode of operation allows study of rise and fall times as the spot appears and disappears behind the wire grid. By reducing those rise and fall times at various angles of the scanning line, the alignment procedure may be expedited.

FIG. 14 illustrates a modification of the circuitry of the vertical deflection generator (FIG. 6) in order to achieve this rapid repetition rate. Parts corresponding to those previously described are referenced by the same numerals. In place of the multi-level selector switch 158, the selector 1158 is used having three positions. Positions 2 and 3 of the selector 1158 correspond to the fast and slow positions, respectively (used for visual display and recording), in the two position selector switch 158. Position 1 of selector 1158 is the additional position used for the fast repetition rate. An additional sawtooth generator 590 is provided which is connected to position 1 of selector switch 1158–10. This additional tenth level of the selector switch is added to connect in the auxiliary sawtooth generator 590 and, at the same time, to disconnect the vertical sawtooth generator from the output cathode follower 182. Selector 1158–1 disconnects the charging and discharging paths from the vertical generator capacitors 162 or 168. The auxiliary sawtooth generator 590 may be of any suitable type such as the conventional thyratron sawtooth generator. This generator 590 is connected to an operating potential via the selector switch 1158–11 in its position 1. In positions 2 and 3 of the latter switch, the generator 590 is inoperative. The sawtooth generator 590 may have suitable adjustments to provide variations in the frame rate. The other levels of the selector switch 1158 are not shown, but are generally similar to the corresponding levels of the selector switch 158–2 thru 158–9 (FIGS. 5–7) insofar as the fast and slow contacts of those switches are concerned. The position 1 of each of the levels of selector switch 1158 is for purposes of preliminary search and alignment provided by the fast sawtooth generator 590. Thus, selector switch 1158–1 has its position 1 left open circuited. Selector 1158–2 is the same as 158–2 with position 1 also left open circuited because the sampling procedure would not be used in this mode of operation. Selector 1158–3 has its position 1 connected to switch contact 210 together with position 2 in order to permit automatic recycling in both of these positions. Selector 1158–4 has its position 1 returned to ground in the same way as position 3 in order that alternation of line and raster scanning is prevented. The switch selectors associated with the horizontal generator (FIG. 7) namely, selectors 1158–5 thru 1158–8 have their contacts at position 1 connected directly to the contacts at position 2 because the operation for the preliminary search and alignment scan is the same as for the fast scan. Selector 1158–9 has its position 1 contact left open circuited because the lamps are not used during the preliminary search scanning. In other respects, the construction and operation of the system with a preliminary search and alignment scanning arrangement is the same as described above.

FIG. 15 illustrates a modification of a circuit used in the circuits of FIGS. 6 and 7 for deriving an attenuated deflection voltage for the column deflection plates. A sawtooth generator 592 supplies either the vertical or horizontal sawtooth voltage to a resistor 594 which together with resistor 596 forms a mixing (or adder) network. A potentiometer 598 is manually adjustable to provide a direct insertion voltage via the cathode follower 600 to the resistor 596. The combined voltage at the junction of the resistors 594 and 596 is supplied via cathode follower 602 to one end of an attenuator resistor 604. A tap 606 on a cathode resistor of cathode follower 600 is connected to the grid of a cathode follower 608, the cathode of which is connected to the other end of attenuator 604. A fixed relay contact 610 is connected to an adjustable tap on the attenuator 604, and a second fixed contact 612 is connected to the cathode of the cathode follower 608. A relay coil 614 actuates the relay switch pole 616.

In operation, the voltage supplied to the cathode follower 602 and thereby to one end of the attenuator 604 is a composite of the sawtooth voltage and of the direct voltage insertion via the potentiometer 598. The voltage supplied by the cathode follower 608 to the attenuator 604 is exactly equal to the direct voltage insertion attenuated by an appropriate amount corresponding to the effect of resistor 596 so that the same insertion voltage is supplied to both ends of the attenuator 604. Accordingly, the switch contact 612 always receives the direct insertion voltage without effect of the sawtooth voltage, the switch contact 610 receives the attenuator voltage which corresponds to the desired column deflection voltage for a search raster. The relay coil 614 corresponds in operation to the relay coil 238 (FIG. 6) so that the output voltage derived at the relay pole 616 is either the column deflection voltage or the stationary beam positioning voltage, depending upon the position of that relay pole 616. With this arrangement, there is complete de-coupling of the size of the search raster and of the insertion voltage which determines the position of the stationary column beam, whereby the insertion voltage is not disturbed during the process of adjusting the attenuator 604 to derive different sizes of search rasters.

The foregoing description sets forth an example of an embodiment of this invention. Circuit parameters presented in the drawing are for purposes of illustration and not for the purpose of restricting the scope of this invention. Various forms of this invention, both in terms of the circuits and the system arrangements that are possible, are within the scope of this invention.

The following triode types are used in the illustrated circuits, and the reference numerals of the corresponding half tubes are indicated: 12AX7, tubes 140, 142, 182, 186, 300, 302, 350, 380, 382, 386, 388, 432, 434, 438, 440, 532, 534; 12AU7, tubes 184, 190, 219, 240, 296, 298, 310, 312, 328, 330, 346, 448, 450, 528, 550, 554, 560; 12AT7, tubes 198, 204, 206, 360, 570, 572; 6SN7, tubes 390, 392, 452, 454, 460, 462. In the attenuator 364 (FIG. 7), the resistors 366 assume successive values that are the same as those of the attenuator 245 (FIG. 6).

Accordingly, it is seen from the foregoing description that a new and improved electron beam probe system is provided. This system is suitable for X-ray microanalysis as well as for presenting electron images. The system is adapted for locating areas of a specimen to be analyzed and for providing a quantitative analysis of the specimen during the scanning operation.

What is claimed is:

1. An X-ray microanalyzer comprising means for removably supporting different specimens to be analyzed, means for producing a high energy electron beam and for directing said beam to irradiate a specimen at said supporting means, to stimulate the emission of X-rays that have different characteristics in accordance with the characteristics of the irradiated specimens, means for receiving the X-rays emitted from an irradiated specimen for deriving electrical signal in accordance with the characteristics thereof, scanning means for producing an image in accordance with said electrical signals, and means for deflecting said electron beam in a plurality of modes, one of which is over an area and for operating said scanning means in synchronism to produce a magnified image of the characteristics of said specimen, said deflecting means including means for varying the range of deflection of said beam to vary the magnification of said image and means for periodically alternating during successive time periods the deflection of said beam between said area mode and another of said modes.

2. An electron beam probe system comprising means for supporting a specimen, means for producing a high energy electron beam and for directing said beam to a specimen at said supporting means, means for deriving electrical signals in accordance with the effects of said beam on a specimen, scanning means for producing an image in accordance with said electrical signals, and means for deflecting said electron beam and for operating said scanning means in synchronism, said beam deflecting means including means for adjusting the range of deflection of said electron beam, and means for varying the position of said range of deflection within a certain area of said specimen in order to deflect said beam over different selected portions of said area.

3. An electron beam probe system comprising means for supporting a specimen, means for producing a high voltage electron beam and for directing the beam to a specimen at said supporting means; means for deflecting said electron beam in two transverse directions to scan an area of a specimen, said deflecting means including means for generating deflection signals, means for varying the range of said deflection signals and for varying a direct value of said deflection signals to vary the size and position of the raster produced by said deflection signals; means for deriving electrical signals in accordance with the effect of said electron beam on a specimen, means responsive to said deflection signals and synchronously deflected with said electron beam for producing a display image in accordance with said derived electrical signals.

4. An electron beam probe system comprising means for supporting a specimen, means for producing a high energy electron beam and for directing said beam to a specimen at said supporting means, means for deriving electrical signals in accordance with the effects of said beam on a specimen, scanning means for producing an image in accordance with said electrical signals, and means for selectively deflecting said electron beam over an area of a specimen and for operating said scanning means in synchronism, said beam deflecting and scanning operating means including means for positioning said beam to be stationary at a selected point of said specimen area during predetermined time periods between periods of beam deflection.

5. An electron beam probe system comprising means for supporting a specimen, means for producing a high energy electron beam and for directing said beam to a specimen at said supporting means, means for repeatedly deflecting said beam over an area during successive spaced time periods including means operative during intermediate time periods for controlling said beam to be stationary at a certain position in said area and for a certain time duration.

6. An electron beam probe system as recited in claim 5 wherein said beam controlling means includes means for adjusting the time during which said beam remains stationary.

7. An electron beam probe system as recited in claim 5 wherein said beam controlling means includes means for adjusting the position of said beam in said area.

8. An electron beam probe system comprising means for supporting a specimen, means for producing a high energy electron beam and for directing said beam to a specimen at said supporting means, means for deriving electrical signals in accordance with the effects of said beam on a specimen, and means for deflecting said beam in a line across a portion of said specimen including means for adjusting the directional angle of said line of beam deflection.

9. An electron beam probe system as recited in claim 8 wherein said adjusting means includes means for reversing the direction of said line.

10. An electron beam probe system as recited in claim 8 wherein said adjusting means includes means for selecting the directional quadrant of said line.

11. An electron beam probe system as recited in claim 8 wherein said beam deflecting means includes means for varying the length of said line.

12. An electron beam probe system as recited in claim 8 wherein said beam deflecting means includes means for varying the scanning rate.

13. An electron beam probe system as recited in claim 8 wherein said beam deflecting means includes means for varying the position of said line over an area.

14. An electron beam probe system as recited in claim 8 wherein said beam deflecting means includes means for periodically generating a first waveform, and said adjusting means includes means for deriving two waveforms as proportional amounts of said first waveform, and means for varying said proportional amounts for said two waveforms together and in opposite directions, said beam deflecting means including means for deflecting said beam in accordance with a combination of said two waveforms.

15. An electron beam probe system as recited in claim 14 wherein said waveforms are linear.

16. An electron beam probe system comprising means for supporting a specimen, means for producing a high energy electron beam and for directing said beam to a specimen at said supporting means, means for deriving electrical signals in accordance with the effects of said beam on a specimen, means for deflecting said beam in a line across a portion of said specimen including means for adjusting the directional angle of said line of beam deflection, and scanning means operative in the same pattern and in synchronism with said beam deflecting means for producing an image in accordance with said electrical signals.

17. An electron beam probe system as recited in claim 16 wherein said beam deflecting means includes means for generating two periodic waveforms at different rates, means for diverting said beam in one condition in two transverse directions respectively in accordance with said two waveforms and in a second condition in two transverse directions in accordance with one of said waveforms for both directions, and means responsive to one of said waveforms for controlling said diverting means to alternate in operation between said one and said second condition.

18. An electron beam probe system as recited in claim 16 wherein said beam deflecting means includes means for deflecting said beam in two transverse directions to scan an area.

19. An electron beam probe system as recited in claim 18, and further including means for selectively operating said beam deflecting means for either line deflection or area scan.

20. An electron beam probe system as recited in claim 18, and further including means for controlling said beam deflecting means to alternate between line deflection and area scan operation.

21. An electron beam probe system comprising means for supporting a specimen, means for producing a high energy electron beam and for directing said beam to a specimen at said supporting means, means for repeatedly deflecting said beam over an area during successive spaced time periods including means operative during intermediate time periods for controlling said beam to be stationary at a certain position in said area and for a certain time duration, means for deriving electrical signals in accordance with the effects of said beam on said specimen, and scanning means operative in the same pattern and in synchronism with said beam deflecting means for producing an image in accordance with said electrical signals.

22. An electron beam probe system as recited in claim 21, wherein said scanning means includes means for indicating the value of electrical signals derived during said intermediate time periods.

23. An electron beam probe system as recited in claim 22, wherein said scanning means further includes means for indicating on said image said position of said stationary beam.

24. An electron beam probe system as recited in claim 21, wherein said scanning means includes means for producing a line indicating on said image said position of said stationary beam and having a length varying in accordance with the value of said electrical signals derived during said intermediate time periods.

25. An electron beam probe system as recited in claim 24 wherein said line producing means includes means for selecting the direction of said line.

26. An electron beam probe system as recited in claim 24 wherein said scanning means further includes a circuit for modulating the amplitude of an alternating signal in accordance with said derived electrical signals, a deflection system, and means for switching said modulated alternating signal to said scanning deflection system during said intermediate periods.

27. An electron beam probe system as recited in claim 21 wherein said beam deflecting means includes a periodic deflection waveform generator, and said controlling means includes a time delay circuit for preventing recycling of said generator, and means for supplying selected constant signals for controlling the beam deflection during said intermediate time periods.

28. An X-ray microanalyzer comprising means for removably supporting different specimens to be analyzed, means for producing a high energy electron beam and for directing said beam to irradiate a specimen at said supporting means to stimulate the emission of X-rays that have different characteristics in accordance with the characteristics of the irradiated specimens, means for receiving the X-rays emitted from an irradiated specimen for deriving electrical signals in accordance with the characteristics thereof, scanning means for producing an image in accordance with said electrical signals, and means for deflecting said electron beam and for operating said scanning means in synchronism to produce a magnified image of the characteristics of said specimen, said deflecting means including means for generating two periodic waveforms at different rates, and a common control for adjusting together the rates of said wave forms to maintain a constant number of waveforms of the faster rate per waveform of the slower rate.

29. An X-ray microanalyzer as recited in claim 28 wherein said deflecting means includes another control for adjusting the rate of one of said waveforms independently of the other to vary the number of faster waveforms per slower waveform.

30. An X-ray microanalyzer as recited in claim 28 wherein said waveform generating means includes two sawtooth generators, each of said generators having a capacitor circuit, and having switch means for varying by steps the currents in said capacitor circuits, said common rate adjusting control being connected to said switch means of both of said generators.

31. An X-ray microanalyzer as recited in claim 30 wherein one of said generators has a synchronizing pulse oscillator having switch means for varying the pulse rate of said oscillator, said common rate adjusting control being connected also to said pulse rate switch means.

32. An X-ray microanalyzer as recited in claim 28 wherein said waveform generating means includes two sawtooth generators, each of said generators having a plurality of capacitor circuits, and switch means for selectively connecting one of said capacitor circuits for operation therein, said common rate adjusting control including means connected to said switch means of both of said generators.

33. An X-ray microanalyzer as recited in claim 32 wherein each of said generators further has second switch means for varying the currents in said capacitor circuits, said common rate adjusting control further including means connected to said second switch means of both of said generators.

34. An X-ray microanalyzer as recited in claim 32 wherein one of said generators has two oscillators for supplying synchronizing pulses at different repetition rates, and switch means for connecting one of said oscillators for operation therein, said common rate adjusting control means being connected to said oscillator switch means.

35. An X-ray microanalyzer comprising means for supporting different specimens to be analyzed, means for producing an electron beam, means for directing said beam to irradiate a specimen at said supporting means to stimulate the emission of X-rays, means for deflecting said beam over an area, means for receiving the X-rays emitted from an irradiated specimen and for deriving electrical signals in accordance with the characteristics thereof, display means for producing an image in accordance with said electrical signals including means for scanning an area, and means for supplying deflection signals to said beam deflecting means and to said display scanning means for synchronous operation thereof, said deflection signal supplying means including means for generating two periodic waveforms having certain ranges, means for adjusting the amplitudes of said waveforms, and means for variably inserting direct signal levels into said waveforms with said levels assuming values substantially over said waveforms ranges.

36. An X-ray microanalyzer as recited in claim 35 wherein said periodic waveforms are sawtooth voltages, said amplitude adjusting means including separate variable impedances connected to receive said voltages, and said level inserting means including separate means for varying the voltage level of the output of the associated ones of said variable impedances.

37. An X-ray microanalyzer as recited in claim 36 wherein said deflection signal supplying means includes a common control for adjusting said variable impedances together to maintain a constant aspect ratio.

38. An X-ray microanalyzer as recited in claim 35 wherein said periodic waveforms are sawtooth voltages, said level inserting means including separate variable means for adding voltage levels to said waveforms, said amplitude adjusting means including separate variable impedances for receiving said voltage levels and said waveforms with added voltage level at different terminals thereof.

39. An X-ray microanalyzer as recited in claim 38 wherein said deflection signal supplying means includes switching means for alternatively supplying as said deflection signals the output of said amplitude adjusting means or said voltage levels.

40. An X-ray microanalyzer as recited in claim 35 wherein said deflection signal supplying means includes switching means for alternatively supplying as said deflection signals either said direct signal levels or said periodic waveforms of adjusted amplitude and varied level.

References Cited by the Examiner
UNITED STATES PATENTS

| | | | |
|---|---|---|---|
| 2,418,029 | 3/1947 | Hillier | 250—49.5 |
| 2,439,324 | 4/1948 | Walker | 315—26 |
| 2,914,697 | 11/1959 | Smith | 315—26 |
| 2,916,621 | 12/1959 | Wittry | 250—49.5 |

OTHER REFERENCES

Bernard et al.: "An Electrostatic Scanning System for The X-ray Microanalyzer," X-ray Microscopy and X-ray Microanalysis (Proceedings of The Second International Symposium, Stockholm 1959), edited by Engstrom, Cosslett and Patee, 1960, pages 379 to 384.

Castaing, "Electron Probe Microanalysis," Electronics and Electron Physics, vol. 12, pages 317–384 (1960).

Cosslett et al.: "Micro-analysis by a Flying-Spot X-ray Method," Nature, vol. 177, 1956, pages 1172–1173.

Duncumb: "The X-ray Scanning Microanalyser," British Journal of Applied Physics, vol. 10, 1959, pages 420 to 427.

Duncumb: "Electron Probe Methods Microanalysis," II British Journal of Applied Physics, pages 171–175 (1960).

Duncumb et al.: "Design Considerations of an X-Ray Scanning Microanalyser Used Mainly for Metallurgical Applications," X-ray Microscopy and X-ray Microanalysis (Proceedings of The Second International Symposium, Stockholm 1959), edited by Engstrom, Cosslett and Pattee, 1960, pages 358–364.

McMullan: "An Improved Scanning Electron Microscope For Opaque Specimens," Proceedings of the Institute of Electrical Engineers, part II, volume 100, 1953, pages 245–256.

RALPH G. NILSON, *Primary Examiner.*